United States Patent
Zhou et al.

(10) Patent No.: US 11,452,107 B2
(45) Date of Patent: Sep. 20, 2022

(54) LOW OVERHEAD COMPONENT CARRIER SELECTION FOR MULTI-COMPONENT CARRIER COMMUNICATION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Hamed Pezeshki, San Diego, CA (US); Konstantinos Dimou, San Francisco, CA (US); Rajat Prakash, San Diego, CA (US); Vinay Joseph, Calicut (IN); Sony Akkarakaran, Poway, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 16/891,560

(22) Filed: Jun. 3, 2020

(65) Prior Publication Data
US 2021/0029703 A1     Jan. 28, 2021

Related U.S. Application Data

(60) Provisional application No. 62/877,254, filed on Jul. 22, 2019.

(51) Int. Cl.
*H04W 72/04*     (2009.01)
*H04L 5/00*      (2006.01)
*H04L 1/18*      (2006.01)

(52) U.S. Cl.
CPC ....... *H04W 72/0493* (2013.01); *H04L 1/1819* (2013.01); *H04L 5/001* (2013.01); *H04W 72/042* (2013.01); *H04W 72/0446* (2013.01)

(58) Field of Classification Search
CPC .......... H04W 72/0493; H04W 72/042; H04W 72/0446; H04L 1/1819; H04L 5/001
(Continued)

(56) References Cited

U.S. PATENT DOCUMENTS

2018/0287843 A1    10/2018  Chen et al.
2020/0163061 A1*    5/2020  Tang ................... H04W 72/042

FOREIGN PATENT DOCUMENTS

EP    2536234 A1    12/2012
EP    3637897 A1     4/2020
(Continued)

OTHER PUBLICATIONS

International Search Report and Written Opinion—PCT/US2020/036086—ISA/EPO—dated Aug. 27, 2020.
(Continued)

*Primary Examiner* — Peter G Solinsky
(74) *Attorney, Agent, or Firm* — Holland & Hart LLP

(57) ABSTRACT

Methods, systems, and devices for wireless communications are described. A user equipment (UE) may receive control signaling configuring the UE with a plurality of component carriers (CCs) for communicating with a base station and a semi-persistent resource allocation of a resource for each CC of the plurality of CCs. The UE may identify an availability indicator that indicates availability of the resource of the semi-persistent resource allocation on each CC of the plurality of CCs. The UE may communicate a data transmission via at least a subset of the plurality of CCs based at least in part on the availability indicator.

58 Claims, 20 Drawing Sheets

(58) Field of Classification Search
USPC .......................................................... 370/329
See application file for complete search history.

(56) References Cited

FOREIGN PATENT DOCUMENTS

EP          3583734 B1 * 12/2021   ........... H04L 1/1812
WO    WO-2019028890 A1    2/2019

OTHER PUBLICATIONS

Samsung: "DL CC Activation Using Bitmap", 3GPP Draft, 3GPP TSG-RAN2#69bis meeting, R2-102450, DL CC Activation Bitmap, 3rd Generation Partnership Project (3GPP), Mobile Competence Centre, 650, Route Des Lucioles, F-06921, Sophia-Antipolis Cedex, France, vol. RAN WG2, No. Beijing, china, Apr. 12, 2010-Apr. 16, 2010, Apr. 6, 2010 (Apr. 6, 2010), XP050422685, 2 pages, [retrieved on Apr. 6, 2010] the whole document.

* cited by examiner

LOW OVERHEAD COMPONENT CARRIER SELECTION FOR MULTI-COMPONENT CARRIER COMMUNICATION

CROSS REFERENCE

The present Application for Patent claims the benefit of U.S. Provisional Patent Application No. 62/877,254 by ZHOU et al., entitled "LOW OVERHEAD COMPONENT CARRIER SELECTION FOR MULTI-COMPONENT CARRIER COMMUNICATION," filed Jul. 22, 2019, assigned to the assignee hereof, and expressly incorporated by reference herein.

BACKGROUND

The following relates generally to wireless communications, and more specifically to low overhead component carrier (CC) selection for multi-component carrier (multi-CC) communication.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may use resources that are semi-persistently scheduled to support communications between a base station and a UE. The semi-persistent resources may be for uplink communications (e.g., autonomous uplink (AUL) communications, in a configured grant for uplink communications, etc.) and/or for downlink communications (e.g., in a configured grant for downlink communications, in semi-persistent scheduled (SPS) communications, etc.). Conventional semi-persistent techniques are deficient.

SUMMARY

The described techniques relate to improved methods, systems, devices, and apparatuses that support low overhead component carrier (CC) selection for multi-component carrier (multi-CC) communication. Generally, the described techniques provide mechanisms that allow, or otherwise support, resources that are semi-persistently allocated to be dynamically reassigned or otherwise reconfigured on a per-CC basis. For example, the base station may transmit or otherwise provide control signaling to a user equipment (UE) that configures a plurality of CCs for communications between the base station and UE. The control signaling may also identify or otherwise indicate a semi-persistent resource allocation for resource(s) for each CC. In some aspects, the control signaling may configure the UE with the CCs and the semi-persistent resource allocation.

The UE may identify or otherwise determine an availability indicator that indicates the availability of the resources within the semi-persistent resource allocation for each CC and, based on the availability indicator, communicate with the base station via at least some of the CCs (e.g., a subset) and using the corresponding resource(s) of the semi-persistent resource allocation. For example, the base station may transmit or otherwise provide a signal, e.g., a downlink control information (DCI), which may be used for an uplink grant and/or a downlink grant. As the DCI is generally transmitted at the beginning of each slot, this may provide a mechanism to dynamically activate or deactivate the resource(s) of the semi-persistent resource allocation on a per-CC basis. In some aspects, this may include a DCI on one CC activating/deactivating resources from the semi-persistent resource allocation for that CC and/or for other CCs. Accordingly, this may enable the base station and UE to dynamically activate/deactivate (e.g., indicated as either available or are not available or suspended or in-use) semi-persistent resources on a per-CC basis with minimal additional signaling.

A method of wireless communications by a UE is described. The method may include receiving control signaling configuring the UE with a set of CCs for communicating with a base station and a semi-persistent resource allocation of a resource for each CC of the set of CCs, identifying an availability indicator that indicates availability of the resource of the semi-persistent resource allocation on each CC of the set of CCs, and communicating a data transmission via at least a subset of the set of CCs based on the availability indicator.

An apparatus for wireless communications by a UE is described. The apparatus may include a processor, memory coupled with the processor, and instructions stored in the memory. The instructions may be executable by the processor to cause the apparatus to receive control signaling configuring the UE with a set of CCs for communicating with a base station and a semi-persistent resource allocation of a resource for each CC of the set of CCs, identify an availability indicator that indicates availability of the resource of the semi-persistent resource allocation on each CC of the set of CCs, and communicate a data transmission via at least a subset of the set of CCs based on the availability indicator.

Another apparatus for wireless communications by a UE is described. The apparatus may include means for receiving control signaling configuring the UE with a set of CCs for communicating with a base station and a semi-persistent resource allocation of a resource for each CC of the set of CCs, identifying an availability indicator that indicates availability of the resource of the semi-persistent resource allocation on each CC of the set of CCs, and communicating a data transmission via at least a subset of the set of CCs based on the availability indicator.

A non-transitory computer-readable medium storing code for wireless communications by a UE is described. The code may include instructions executable by a processor to receive control signaling configuring the UE with a set of CCs for communicating with a base station and a semi-persistent resource allocation of a resource for each CC of the set of CCs, identify an availability indicator that indicates availability of the resource of the semi-persistent resource allocation on each CC of the set of CCs, and communicate a data transmission via at least a subset of the set of CCs based on the availability indicator.

In some examples of the method, apparatuses, and non-transitory computer-readable medium described herein, the availability indicator may be valid for a time window.

In some examples of the method, apparatuses, and non-transitory computer-readable medium described herein, the time window begins at an end of a transmission identifying the availability indicator.

In some examples of the method, apparatuses, and non-transitory computer-readable medium described herein, identifying the availability indicator may include operations, features, means, or instructions for receiving downlink control information including the availability indicator.

In some examples of the method, apparatuses, and non-transitory computer-readable medium described herein, identifying the availability indicator may include operations, features, means, or instructions for receiving the availability indicator as a bit map that indicates the availability of the resource of the semi-persistent resource allocation on each CC of the set of CCs.

In some examples of the method, apparatuses, and non-transitory computer-readable medium described herein, identifying the availability indicator may include operations, features, means, or instructions for receiving the availability indicator that indicates the resource may be unavailable for a first CC of the set of CCs and that indicates the resource may be available for a second CC of the set of CCs.

In some examples of the method, apparatuses, and non-transitory computer-readable medium described herein, identifying the availability indicator may include operations, features, means, or instructions for receiving the availability indicator via a single CC of the set of CCs.

In some examples of the method, apparatuses, and non-transitory computer-readable medium described herein, identifying the availability indicator may include operations, features, means, or instructions for receiving the availability indicator via two or more CCs of the set of CCs.

In some examples of the method, apparatuses, and non-transitory computer-readable medium described herein, the semi-persistent resource allocation includes resources configured for a configured grant for an uplink transmission.

In some examples of the method, apparatuses, and non-transitory computer-readable medium described herein, the semi-persistent resource allocation includes resources configured for a configured grant for a downlink transmission.

In some examples of the method, apparatuses, and non-transitory computer-readable medium described herein, identifying the availability indicator may include operations, features, means, or instructions for determining that a retransmission may be scheduled on a first CC of the set of CCs, where the availability indicator may be identified to indicate that the resource may be available for communicating the data transmission via the first CC based on determining that the retransmission may be scheduled on the first CC.

In some examples of the method, apparatuses, and non-transitory computer-readable medium described herein, determining that the retransmission may be scheduled may include operations, features, means, or instructions for determining that the retransmission may be scheduled based on at least one of a scrambling of downlink control information by a configured scheduling radio network temporary identifier, a toggling state of a new data indicator, a scheduling of a hybrid automatic repeat request process identifier, or any combination thereof.

In some examples of the method, apparatuses, and non-transitory computer-readable medium described herein, at least one parameter of the semi-persistent resource allocation may be updated by the corresponding parameter indicated in the downlink control information that schedules the retransmission.

In some examples of the method, apparatuses, and non-transitory computer-readable medium described herein, the at least one parameter includes a number of resource blocks.

In some examples of the method, apparatuses, and non-transitory computer-readable medium described herein, identifying the availability indicator may include operations, features, means, or instructions for determining a retransmission may be not scheduled for a first CC of the set of CCs, where the availability indicator may be identified to indicate that the resource may be not available for communicating the data transmission via the first CC based on determining that the retransmission may be not scheduled.

A method of wireless communications by a base station is described. The method may include transmitting control signaling configuring a UE with a set of CCs for communicating with the base station and a semi-persistent resource allocation of a resource, transmitting an availability indicator that indicates availability of the resource of the semi-persistent resource allocation on each CC of the set of CCs, and communicating a data transmission via at least a subset of the set of CCs based on the availability indicator.

An apparatus for wireless communications by a base station is described. The apparatus may include a processor, memory coupled with the processor, and instructions stored in the memory. The instructions may be executable by the processor to cause the apparatus to transmit control signaling configuring a UE with a set of CCs for communicating with the base station and a semi-persistent resource allocation of a resource, transmit an availability indicator that indicates availability of the resource of the semi-persistent resource allocation on each CC of the set of CCs, and communicate a data transmission via at least a subset of the set of CCs based on the availability indicator.

Another apparatus for wireless communications by a base station is described. The apparatus may include means for transmitting control signaling configuring a UE with a set of CCs for communicating with the base station and a semi-persistent resource allocation of a resource, transmitting an availability indicator that indicates availability of the resource of the semi-persistent resource allocation on each CC of the set of CCs, and communicating a data transmission via at least a subset of the set of CCs based on the availability indicator.

A non-transitory computer-readable medium storing code for wireless communications by a base station is described. The code may include instructions executable by a processor to transmit control signaling configuring a UE with a set of CCs for communicating with the base station and a semi-persistent resource allocation of a resource, transmit an availability indicator that indicates availability of the resource of the semi-persistent resource allocation on each CC of the set of CCs, and communicate a data transmission via at least a subset of the set of CCs based on the availability indicator.

In some examples of the method, apparatuses, and non-transitory computer-readable medium described herein, the availability indicator may be valid for a time window.

In some examples of the method, apparatuses, and non-transitory computer-readable medium described herein, the availability indicator begins at an end of the transmission of the availability indicator.

In some examples of the method, apparatuses, and non-transitory computer-readable medium described herein, transmitting the availability indicator may include operations, features, means, or instructions for transmitting downlink control information including the availability indicator.

In some examples of the method, apparatuses, and non-transitory computer-readable medium described herein, transmitting the availability indicator may include operations, features, means, or instructions for transmitting the availability indicator as a bit map that indicates the availability of the resource of the semi-persistent resource allocation on each CC of the set of CCs.

In some examples of the method, apparatuses, and non-transitory computer-readable medium described herein, transmitting the availability indicator may include operations, features, means, or instructions for transmitting the availability indicator that indicates the resource may be unavailable for a first CC of the set of CCs and that indicates the resource may be available for a second CC of the set of CCs.

In some examples of the method, apparatuses, and non-transitory computer-readable medium described herein, transmitting the availability indicator may include operations, features, means, or instructions for transmitting the availability indicator via a single CC of the set of CCs.

In some examples of the method, apparatuses, and non-transitory computer-readable medium described herein, transmitting the availability indicator may include operations, features, means, or instructions for transmitting the availability indicator via two or more CCs of the set of CCs.

In some examples of the method, apparatuses, and non-transitory computer-readable medium described herein, the semi-persistent resource allocation includes resources configured for a configured grant for an uplink transmission.

In some examples of the method, apparatuses, and non-transitory computer-readable medium described herein, the semi-persistent resource allocation includes resources configured for a configured grant for a downlink transmission.

Some examples of the method, apparatuses, and non-transitory computer-readable medium described herein may further include operations, features, means, or instructions for transmitting downlink control information that updates at least one parameter of semi-persistent resource allocation.

Some examples of the method, apparatuses, and non-transitory computer-readable medium described herein may further include operations, features, means, or instructions for transmitting downlink control information that schedules a retransmission of the data transmission.

DETAILED DESCRIPTION

Figure 1:
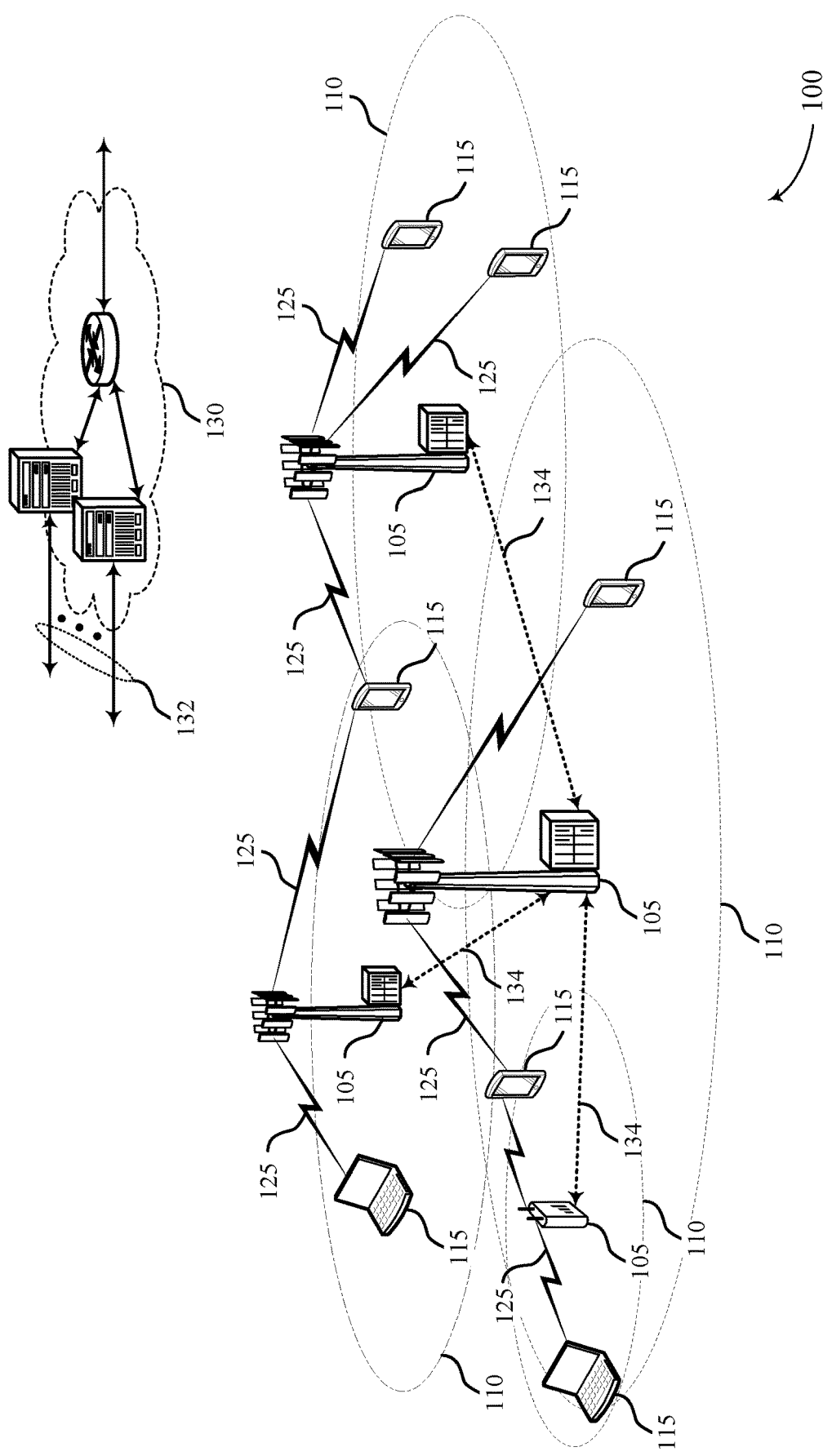
FIG. 1 illustrates an example of a system for wireless communications that supports low overhead component carrier (CC) selection for multi-component carrier (multi-CC) communication in accordance with aspects of the present disclosure.

Some wireless communication systems may use resources that are semi-persistently scheduled to support communications between a base station and a user equipment (UE). The semi-persistent resources may be for uplink communications (e.g., autonomous uplink (AUL) communications, in a configured grant for uplink communications, etc.) and/or for downlink communications (e.g., in a configured grant for downlink communications, in semi-persistent scheduled (SPS) communications, etc.). Some wireless communication systems may also communicate over multiple carriers, e.g., a plurality of component carriers (CCs), between the base station and the UE. Wireless communication system supporting both techniques, however, may be inefficient in that semi-persistently allocated resources may go unused and/or may require significant signaling between the base station and UE in order to reallocate such resources.

Aspects of the disclosure are initially described in the context of a wireless communication system. The described techniques relate to improved methods, systems, devices, and apparatuses that support low overhead CC selection for multi-CC communication. Generally, the described techniques provide mechanisms that allow, or otherwise support, resources that are semi-persistently allocated to be dynamically reassigned or otherwise reconfigured on a per-CC basis. For example, the base station may transmit or otherwise provide control signaling to a UE that configures a plurality of CCs for communications between the base station and UE. The control signaling may also identify or otherwise indicate a semi-persistent resource allocation for resource(s) for each CC. In some aspects, the control signaling may configure the UE with the CCs and a semi-persistent resource allocation.

The UE may identify or otherwise determine an availability indicator that indicates the availability of the resources within the semi-persistent resource allocation for each CC and, based on the availability indicator, communicate with the base station via at least some of the CCs (e.g., a subset of the CCs) and using the corresponding resources of the semi-persistent resource allocation. For example, the base station may transmit or otherwise provide a signal, e.g., a downlink control information (DCI), which may be used for an uplink grant and/or a downlink grant. As the DCI is generally transmitted at the beginning of each slot, this may provide a mechanism to dynamically activate or deactivate the resources of the semi-persistent resource allocation on a per-CC basis. In some aspects, this may include a DCI on one CC activating/deactivating resources from the semi-persistent resource allocation for that CC and/or for other CCs. Accordingly, this may enable the base station and UE to dynamically activate/deactivate (e.g., indicated as either available or are not available, as either suspended or in-use) semi-persistent resources on a per-CC basis with reduced (e.g., minimal) additional signaling.

Aspects of the disclosure are further illustrated by and described with reference to apparatus diagrams, system diagrams, and flowcharts that relate to low overhead CC selection for multi-CC communication.

FIG. 1 illustrates an example of a wireless communication system 100 that supports low overhead CC selection for multi-CC communication in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected CCs using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communication system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive control signaling configuring the UE 115 with a plurality of CCs for communicating with a base station 105 and a semi-persistent resource allocation of a resource for each CC of the plurality of CCs. The UE 115 may identify an availability indicator that indicates availability of the resource of the semi-persistent resource allocation on each CC of the plurality of CCs. The UE 115 may communicate a data transmission via at least a subset of the plurality of CCs based at least in part on the availability indicator.

A base station 105 may transmit control signaling configuring a UE 115 with a plurality of CCs for communicating with the base station 105 and a semi-persistent resource allocation of a resource. The base station 105 may transmit an availability indicator that indicates availability of the resource of the semi-persistent resource allocation on each CC of the plurality of CCs. The base station 105 may communicate a data transmission via at least a subset of the plurality of CCs based at least in part on the availability indicator.

Figure 2:
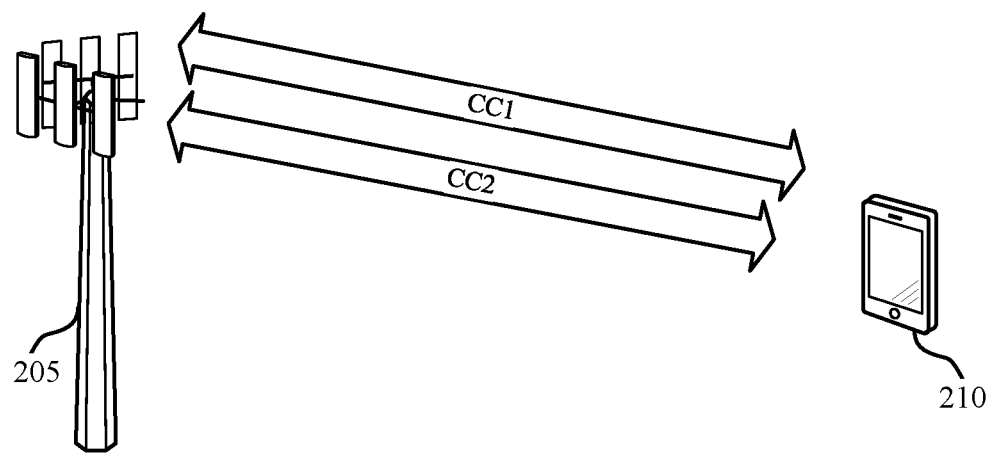
FIG. 2 illustrates an example of a wireless communication system that supports low overhead CC selection for multi-CC communication in accordance with aspects of the present disclosure.

FIG. 2 illustrates an example of a wireless communication system 200 that supports low overhead CC selection for multi-CC communication in accordance with aspects of the present disclosure. In some examples, wireless communication system 200 may implement aspects of wireless communication system 100. Wireless communication system 200 may include base station 205 and UE 210, which may be examples of the corresponding devices described herein.

Broadly, wireless communication system 200 may include base station 205 and UE 210 communicating (e.g., uplink and/or downlink data transmissions) using a plurality of CCs, e.g., CC0 and CC1. Although only two CCs are shown in wireless communication system 200, it is to be understood that base station 205 and UE 210 may communicate using more than two CCs. In some aspects, each CC within the plurality of CCs may be associated with the same frequency range (e.g., frequency range (FR) one (FR1), FR two (FR2), FR three (FR3), and so on) or may be associated with different frequency ranges. For example, the first CC (e.g., CC0)) may be associated with FR1 and the second CC (e.g., CC1) may be associated with FR2, or vice versa. A third, fourth, etc., CC (not shown) may also be associated with the same or with different frequency ranges.

In some aspects, each CC may be associated with a corresponding time interval (e.g., subframe), which may then be divided into smaller time intervals (e.g., slots), which may be the same or may be different between the CCs of the plurality of CCs. For example, a first CC (e.g., CC0) may be associated with a first slot having a first duration and the second CC (e.g., CC1) may be associated with a second slot, which may have the same duration as, or a different duration than, the first slot. In some aspects, the duration of the slots for each time interval associated with each CC may be dependent upon the frequency range for that CC. For example, the first CC (e.g., CC0) may be associated with FR1 having a subcarrier spacing (SCS) of 60 kHz and the second CC (e.g., CC1) may be associated with FR2 having a SCS of 120 kHz. Accordingly, the duration of the slots in the time interval for CC0 on FR1 having a 60 kHz SCS may be different than the duration of the slots in the time interval for CC1 on FR2 having a 120 kHz SCS.

Base station 205 may generally monitor, manage, control, or otherwise configure communications with UE 210 on the plurality of CCs. In some examples, this may include a semi-persistent resource allocation of a resource. The resource may be indefinite or may span a plurality of time intervals (e.g., within a time window). Broadly, a semi-persistent resource allocation of resources may include base station 205 configuring UE 210 with time, frequency, code, spatial, etc., resources. This may be different from other resources which are dynamically allocated within a time interval. Base station 205 may allocate or otherwise configure the semi-persistent resources for UE 210 to use for uplink communications and/or downlink communications using the plurality of CCs. For uplink communications, such semi-persistent resources may be a configured grant for uplink transmissions, AUL transmission resources, and the like. For downlink communications, such semi-persistent resources may be a configured grant for downlink transmission, SPS transmission resources, and the like.

Generally, base station 205 and UE 210 may exchange a variety of signals to configure UE 210 with the plurality of CCs and the semi-persistent allocation of resources for communications. For example, base station 205 may transmit control signaling (e.g., radio resource control (RRC) signaling, medium access control (MAC) control element (CE) signaling, and the like) to UE 210 to activate, identify, or otherwise configure UE 210 with the plurality of CCs and/or the allocation of semi-persistent resources. In some aspects, the semi-persistent resource allocation may be indefinite (e.g., until updated) or may span a plurality of corresponding time intervals (e.g., within a time window) for communicating with base station 205.

However, in some situations one or more of the resources that are semi-persistently allocated to UE 210 may go unused. For example, base station 205 and/or UE 210 may have no information to communicate, one of the CCs may suddenly degrade to a point where it is unusable for communications between base station 205 and UE 210, and the like. However, some wireless communication systems may not be configured to support dynamically activating/deactivating (e.g., indicating whether such resources are available or unavailable). In this situation, the unused resource typically results in waste or is otherwise an inefficient use of such resources due to the excessive signaling associated with reassigning the resource.

For example, some wireless communication systems may support a configured grant being configured on multiple CCs for the same packet data convergence protocol (PDCP) protocol data unit (PDU) or for transport block (TB) duplication to increase robustness. However, UE 210 and/or base station 205 may not need to transmit all copies of the duplicated information, e.g., based on the channel conditions. Nevertheless, the configured grant occasion (e.g., resource occasion) for a particular time/frequency/space allocation (e.g., the semi-persistent resource allocation of resources) may not be dynamically reassigned to other UEs, e.g., when base station 205 and UE 210 are not in synchronization on the selected configured grant occasion. In some wireless communication systems, in order to use such resources efficiently, base station 205 may activate a configured grant on new CC(s) that are associated with good channel quality, while deactivating the configured grant on old CC(s) that are associated with degraded channel quality. However, such wireless communication systems typically use a deactivation DCI that is sent on each CC even in the situation where the configured grant parameters are identical. This results in excessive signaling being associated with reconfiguring the unused resource.

Accordingly, aspects of the described techniques generally enable a DCI based multi-CC configured grant suspension and in-use indication (e.g., an availability indicator). To use resources more efficiently, base station 205 may activate/deactivate configured grants among the configured grants on all CCs in the plurality of CCs based on the latest CC measurement reporting, for example. In some cases, the configured grant configuration per CC may not need to change. A single DCI can signal a bitmap with one bit indicating if a configured grant on a CC is suspended or in-use (e.g., available are not available). This may save sending individual deactivation DCIs per configured grant, which typically includes a large amount of bits (depending upon the DCI format used). In some examples, this may include at least 30 information bits for DCI format 0_1.

Broadly, aspects of the described techniques are equally applicable to both uplink and downlink transmissions using the resources of the semi-persistent resource allocation per CC. Accordingly, UE 210 may determine or otherwise identify an availability indicator that indicates availability of the resource of the semi-persistent resource allocation on each CC of the plurality of CCs. In one example, this may include base station 205 transmitting an availability indicator (e.g., in a DCI, such as an uplink grant DCI and/or a downlink grant DCI). UE 210 may identify the availability indicator based on the DCI. For example, the availability indicator may be conveyed via a bit, a field, a bitmap, and the like, indicating the availability of the resource of the semi-persistent resource allocation on each CC. The availability indicator may be conveyed explicitly or implicitly, e.g., via a bit, a field, a bitmap, etc., and/or based on some other information carried or otherwise indicated in the DCI.

In some aspects, the availability indicator may be valid indefinitely (e.g., until an updated availability indicator is provided) or for a particular time window. For example, the time window may span one or more of the plurality of time intervals, e.g., subframes. In some examples, the time window may begin based at least in part on the transmission (e.g., DCI) identifying the availability indicator, e.g., based on the beginning of the transmission, the end of the transmission, some defined point during the transmission, etc.

Broadly, the availability indicator may carry or convey information indicating whether the resource of the semi-persistent resource allocation is available or unavailable on a per CC basis. For example, the resource indicator may indicate that the resource is available on a first CC (e.g., CC0), but is unavailable on a second CC (e.g., CC1), or vice versa. The resource indicator may generally indicate, for each CC in the plurality of CCs, whether the corresponding resource of the semi-persistent resource allocation is available or unavailable. In some aspects, the availability indicator may be carried or conveyed on one CC (e.g., CC0 or CC1) or on two or more of the CCs of the plurality of CCs (e.g., CC0 and CC1).

In some aspects, the availability indicator may be based, at least in some aspects, on a retransmission. For example, UE 210 may determine that a retransmission is scheduled on a first CC (e.g., CC0) of the plurality of CCs, where the availability indicator is identified to indicate that the resource is available for communicating the data transmission via the first CC based on the determination that the retransmission is scheduled on the first CC. For example, UE 210 may determine that the retransmission is scheduled based on a scrambling of the DCI using a configured scheduling radio network temporary identifier (RNTI), a toggling state of a new data indicator (NDI), a scheduling of a HARQ process identifier, and the like. In some examples, one or more of the parameters of the semi-persistent resource allocation may be updated by a corresponding parameter indicated in the DCI that schedules the retransmission, e.g., a change to the number of resource blocks (RBs). Conversely, UE 210 may determine that a retransmission is not scheduled for the first CC of the plurality of CCs, where the availability indicator is identified to indicate that the resource is not available for communicating the data transmission via the first CC based on the determination that the retransmission is not scheduled.

Accordingly, base station 205 may improve resource usage efficiency by selecting a subset of configured grants (e.g., a subset of CCs from the plurality of CCs) among configured grants on all CCs based on the latest CC measurement report (e.g., the channel performance feedback indicating how each CC is performing). In some aspects, the configured grant configuration per CC may not need to change. The suspension or in-use (e.g., availability or non-availability) of the configured grant may be more reliably signaled by a single bit (or field, or bitmap, etc.) instead of (de)activation DCI(s) being used on each CC. In some examples, a single DCI can be sent with a bit map for used CC indexes (e.g., the bitmap may be used to indicate which CCs to use). More particularly, some wireless communication systems implementing the (de)activation DCI(s) being used on each CC may use 10, 20, 30, or more information bits to convey the same information, dependent upon which DCI format is used.

Based on the availability indicator, base station 205 and UE 210 may communicate one or more data transmissions via at least a subset of the plurality of CCs (e.g., those CCs indicated as having available resources) and using the corresponding resource of the semi-persistent resource allocation. For example, UE 210 may not transmit on a suspended configured grant (e.g., on a resource indicated as being unavailable), which may allow those resources to be reassigned to other UEs. Conversely, UE 210 may transmit on used configured grant occasions with the configuration indicated by the latest (re)activation DCI. Accordingly, aspects of the described techniques may enable a single DCI to signal a bitmap, with one bit indicating if a configured grant on a CC is suspended or in-use (e.g., available or unavailable). This may improve the efficiency by sending the single DCI rather than (de) activation DCIs per configured grant.

Figure 3:
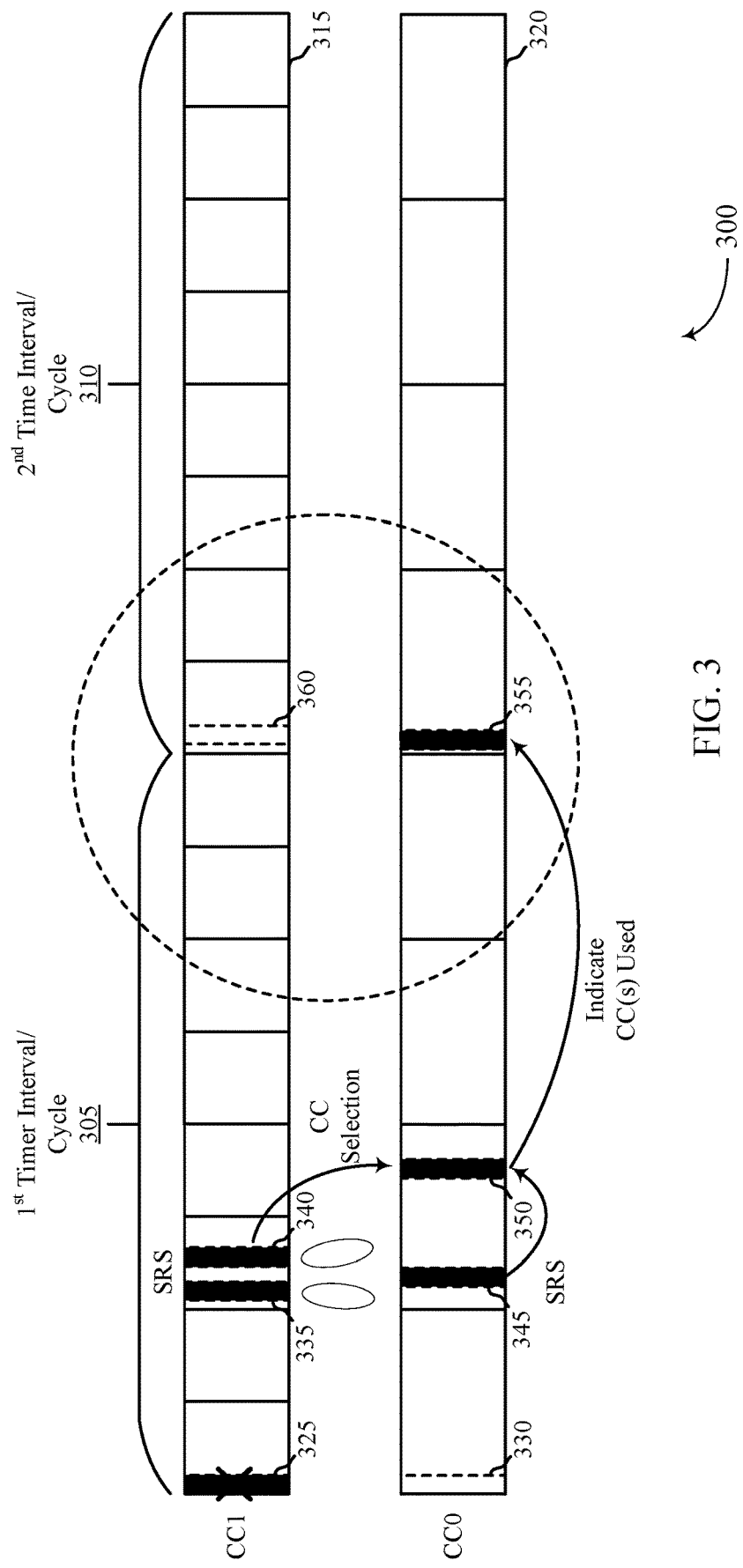
FIG. 3 illustrates an example of a multi-CC configuration that supports low overhead CC selection for multi-CC communication in accordance with aspects of the present disclosure.

FIG. 3 illustrates an example of a multi-CC configuration 300 that supports low overhead CC selection for multi-CC communication in accordance with aspects of the present disclosure. In some examples, multi-CC configuration 300 may implement aspects of wireless communication systems 100 and/or 200. Aspects of multi-CC configuration 300 may be implemented by a base station and/or UE, which may be examples of the corresponding devices described herein.

Broadly, multi-CC configuration 300 illustrates an example where the base station uses control signaling that configures the UE with a plurality of CCs (e.g., a first CC, CC0, and a second CC, CC1) for communicating with the base station and a semi-persistent resource allocation of a resource (e.g., time, frequency, spatial, code, etc., resources during corresponding resource occasions). The semi-persistent resource allocation may be indefinite (e.g., until changed by a later availability indicator) or may span a plurality of time intervals (or cycles, with the first time interval 305 and second time interval 310 being shown by way of example only) for each CC. Broadly, each of the first time interval 305 and the second time interval 310 may be subframes having a plurality of slots 315 and 320, respectively. However, the slots 315 and the slot 320 may have different durations in time due to the first CC and the second CC having different SCS values. For example, the first CC (e.g., CC0) may be in FR1 and have a SCS of 60 kHz and the second CC (e.g., CC1) may be in FR2 and have a SCS of 120 kHz. Accordingly, slots 315 of the second CC may have a shorter duration in time than the slots 320 of the first CC. However, it is to be understood that this is one example only of how the first and second CCs may be implemented. In other examples, the first CC and the second CC may be implemented on the same FR and/or may have the same SCS values such that the slots 315 and 320 may have the same duration.

As discussed, the base station may configure the UE for communications using a plurality of CCs and a semi-persistent resource allocation of a resource. The resource may be valid for a time window, which may include a plurality of time intervals (e.g., the first time interval 305 and the second time interval 310) for each CC. However, according to aspects of the described techniques an availability indicator may be used to indicate the availability of the resource of the semi-persistent resource allocation on each CC. Accordingly, at least some (e.g., a subset) of the resources on each CC may be used (e.g., available) or unused (e.g., unavailable) for a given resource occasion within one or more of the time intervals.

For example, resource occasion 325 (e.g., PUSCH) may correspond to a resource on the second CC in which the wireless communications are not successfully performed. For example, the UE may be unable to transmit on the resource (due to high priority packet arriving for transmission instead, for example) or the UE may perform the transmission but the base station may be unable to successfully decode the transmission using the resources of resource occasion 325 (due to poor channel performance on the second CC, for example). Resource occasion 330 (e.g., PUSCH) may correspond to an unused resource of the semi-persistent resource allocation for the first CC, e.g., no data transmission is provided during resource occasion 330 on the first CC.

Resource occasions 335 and 340 of the second CC and resource occasion 345 of the first CC may be associated with the reference signal transmissions (e.g., a sounding reference signals (SRS) transmissions) that are used by the base station and/or UE in order to perform a CC selection for subsequent resources of the semi-persistent resource allocation. For example, the base station may receive the reference signal transmissions during resource occasions 335, 340, and 345 and determine which CC is performing better, e.g., which CC has a lower congestion level, has a lower interference level, has a higher available throughput level, etc. As the first and second CCs are on different frequency ranges, in this example, the reference signal transmissions during resource occasions 335 and 340 may be beamformed transmissions, e.g., directional transmissions. The base station may use this information to determine whether the first CC and/or the second CC are performing at an acceptable level, and select the better performing CC(s) to use for continued communications between the base station and the UE. In the example illustrated in FIG. 3, the base station may determine that the first CC (e.g., CC0) is performing better than the second CC (e.g., CC1) (or simply that the second CC is performing poorly or below an acceptable threshold) and, accordingly, determine to use one or more of the resource occasions on the first CC for communications with the UE.

Accordingly, during resource occasion 350 (e.g., PDCCH) the base station may transmit or otherwise convey an indication of availability indicator that indicates the availability of a resource of the semi-persistent resource allocation on each CC of the plurality of CCs. For example, the base station may transmit a DCI during resource occasion 350 that uses a bit, a field, a bitmap, and the like, to indicate to the UE that resource occasion 355 (e.g., PUSCH) of the semi-persistent resource allocation on the first CC is available, but that resource occasion 360 (e.g., PUSCH) of the semi-persistent resource allocation on the second CC is unavailable. In some aspects, the availability indicator may identify the particular resource occasion and/or may simply identify which CC of the plurality of CCs (e.g., the first CC and/or the second CC) are available during the second time interval 310.

The UE may receive or otherwise identify the availability indicator and communicate a data transmission with a base station during the resource occasion 355 of the semi-persistent resource allocation on the first CC (e.g., CC0).

In some examples, the resource occasion 360 may be unused or may be reassigned to other UEs. For example, the base station may determine that another UE is experiencing acceptable channel performance on the second CC, and therefore dynamically allocate the resources of the resource occasion 360 to a different UE. Accordingly, the resource occasion 360 that was previously a resource of a semi-persistent resource allocation can be dynamically activated or deactivated (as in this case) based on the availability indicator.

Figure 4:
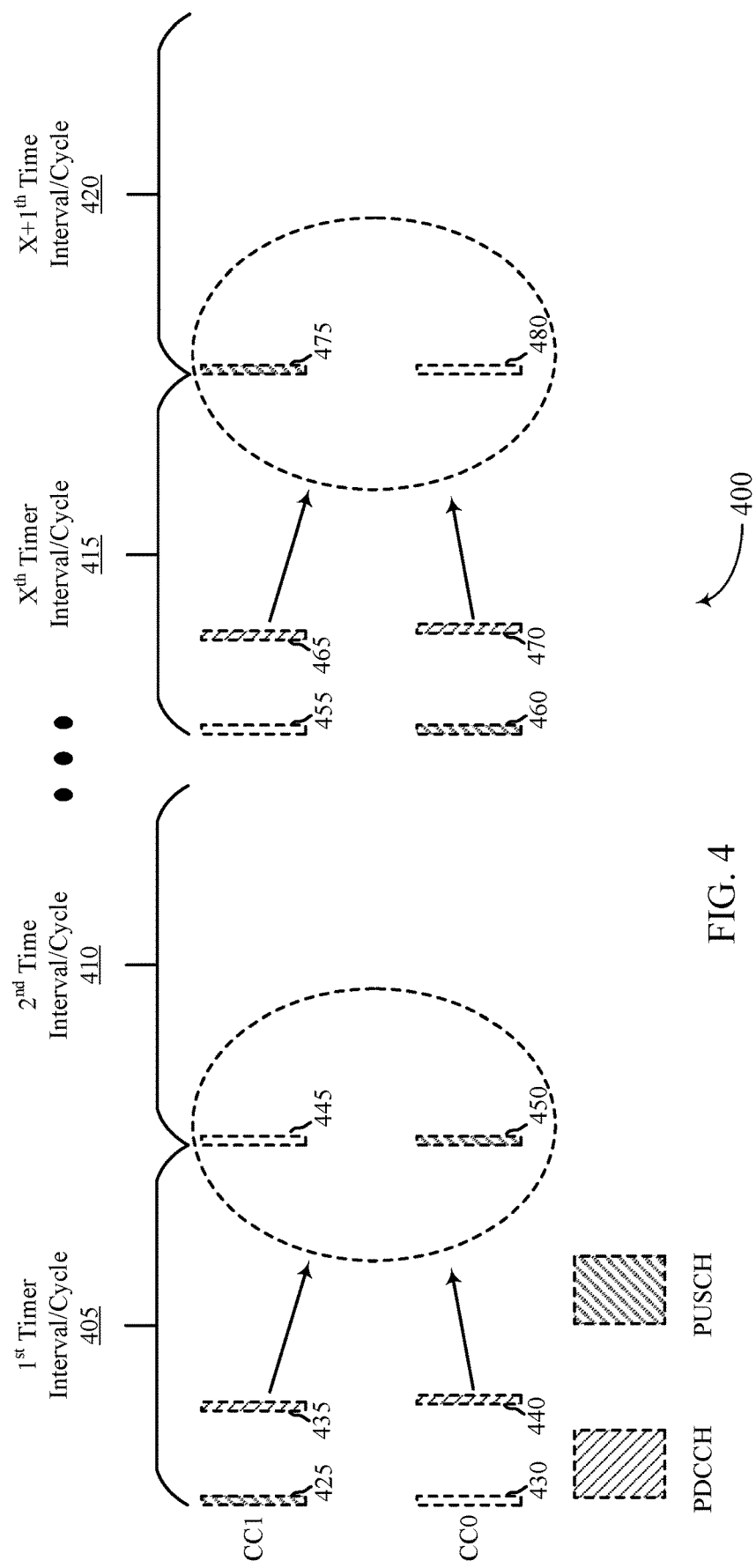
FIG. 4 illustrates an example of a multi-CC configuration that supports low overhead CC selection for multi-CC communication in accordance with aspects of the present disclosure.

FIG. 4 illustrates an example of a multi-CC configuration 400 that supports low overhead CC selection for multi-CC communication in accordance with aspects of the present disclosure. In some examples, multi-CC configuration 400 may implement aspects of wireless communication systems 100 and/or 200 and/or multi-CC configuration 300. Aspects of multi-CC configuration 400 may be implemented by a base station and/or UE, which may be examples of the corresponding devices described herein.

Broadly, multi-CC configuration 400 illustrates an example where one DCI may be sent for every multi-CC configured grant status update (e.g., every CC with a resource of a semi-persistent resource allocation configured). The update (e.g., a PDCCH carrying a DCI indicating the availability indicator) may remain in effect until the next DCI signaling a new update. When a (re) activation DCI is sent to update parameters of a configured grant, it may or may not change a configured grant from suspended (e.g., unavailable) to in-use. To improve DCI reliability (e.g., to improve redundancy), multiple DCIs carrying the same multi-CC configured grant suspension/in-use indications can be sent, e.g., over multiple CCs. Accordingly, the update is successful so long as at least one of the DCIs is received.

The base station may use control signaling that configures the UE with a plurality of CCs (e.g., a first CC, CC0, and a second CC, CC1) for communicating with the base station and a semi-persistent resource allocation of a resource (e.g., time, frequency, spatial, code, etc., resources during corresponding resource occasions) in a plurality of time intervals (or cycles, with the first time interval 405, a second time interval 410, an $X^{th}$ time interval 415, and an $X^{th}+1$ time interval 420 being shown by way of example only) for each CC. Broadly, each of the time intervals may be subframes having a plurality of slots (with the slots not being shown for ease of reference). In some examples, the first CC (e.g., CC0) may be in FR1 and have a SCS of 60 kHz and the second CC (e.g., CC1) may be in FR2 and have a SCS of 120 kHz. However, it is to be understood that this is one example only of how the first and second CCs may be implemented. In other examples, the first CC and the second CC may be implemented on the same FR and/or may have the same SCS values such that the respective slots may have the same duration.

As discussed, the base station may configure the UE for communications using a plurality of CCs and a semi-persistent resource allocation of a resource for each CC. The semi-persistent resource allocation may correspond to a configured grant (e.g., for uplink transmissions) and/or an SPS (e.g., for downlink transmissions). However, according to aspects of the described techniques an availability indicator may be used to indicate the availability of the resource(s) of the semi-persistent resource allocation on each CC. Accordingly, at least some (e.g., a subset) of the resources on each CC may be used (e.g., available) or unused (e.g., suspended or unavailable) for a given resource occasion within one or more of the time intervals.

For example, resource occasion 425 (e.g., PUSCH) may correspond to a resource of the semi-persistent resource allocation on the second CC in which the wireless communications are performed. Resource occasion 430 (e.g., PUSCH) may correspond to an unused resource of the semi-persistent resource allocation for the first CC, e.g., no data transmission is provided during resource occasion 430 on the first CC.

The base station and/or UE may determine that at least some of the resources of the semi-persistent resource allocation may not be used. For example, the resources may be unused due to poor channel performance on one or more of the CCs, based on the respective device having no data to transmit, and the like. For example, the base station may monitor reference signal transmissions and determine which CC is performing better, e.g., which CC has a lower congestion level, has a lower interference level, has a higher available throughput level, etc. The base station may use this information to determine whether the first CC and/or the second CC are performing at an acceptable level, and select the better performing CC(s) to use for continued communications between the base station and the UE. In the example illustrated in FIG. 4, the base station may determine that the first CC (e.g., CC0) is performing better than the second CC (e.g., CC1) (or simply that the second CC is performing poorly or below an acceptable threshold) and, accordingly, determine to use one or more of the resource occasions on the first CC for communications with the UE.

Accordingly, during resource occasions 435 and 440 (e.g., PDCCH) the base station may transmit or otherwise convey an indication of an availability indicator that indicates the availability of a resource of the semi-persistent resource allocation on each CC of the plurality of CCs. For example, the base station may transmit a DCI during each of resource occasion 435 and 440 that uses a bit, a field, a bitmap, and the like, to indicate to the UE that resource occasion 450 and 460 (e.g., PUSCH) of the semi-persistent resource allocation on the first CC are available, but that resource occasions 445 and 455 (e.g., PUSCH) of the semi-persistent resource allocation on the second CC are unavailable. In some aspects, the availability indicators may identify the particular resource occasion and/or may simply identify which CC of the plurality of CCs (e.g., the first CC and/or the second CC) are available during the second time interval 410.

In some aspects, the base station may transmit the same availability indicators (e.g., the same configured DCIs) in resource occasions 435 and 440 to improve the reliability of the DCIs (e.g., to add redundancy to improve reception). Accordingly, the UE will be able to identify the availability indicator based on successfully receiving and decoding at least one of the DCIs on one of the CCs.

In some aspects, the availability indicators may be valid for a time window (e.g., one or more of the time intervals). In the example illustrated in FIG. 4, the availability indicator is valid from the second time interval 410 until the $X^{th}$ time interval 415, including any intervening time intervals. However, this is only one example and different time windows (on a per-CC basis) may also be used. The time window may be measured (e.g., begin and/or end) based on a fixed time (e.g., an absolute time value) and/or based on a relative time (e.g., based on the timing of the occurrence of a particular event). In one example, the time window may begin at the beginning or end of the transmission identifying the availability indicator. For example, the time window may begin at the end of the resource occasions 445 and/or 450 and may end after resource occasions 455 and 460 of the $X^{th}$ time interval 415.

The UE may receive or otherwise identify the availability indicator and communicate a data transmission with a base station during the resource occasions 450 and 460 of the semi-persistent resource allocation on the first CC (e.g., CC0).

In some examples, the resource occasions 445 and 455 may be unused or may be reassigned to other UEs. For example, the base station may determine that another UE is experiencing acceptable channel performance on the second CC, and therefore dynamically allocate the resources of the resource occasion 445 and/or 455 to a different UE. Accordingly, the resource occasions 445 and 455 that were previously a resource of a semi-persistent resource allocation can be dynamically activated or deactivated (as in this case) based on the availability indicator.

During the $X^{th}$ time interval 415, the base station and/or UE may again perform CC selection (e.g., based on the channel performance of each CC). In the example illustrated in FIG. 4, the first CC may be experiencing poor channel performance and, therefore, the base station may determine to use the second CC (e.g., CC1) for continued communications with the UE using the resources of the semi-persistent resource allocation. Accordingly, during resource occasions 465 and 470 (e.g., PDCCH) the base station may again transmit or otherwise convey availability indicators to the UE indicating that the resource occasion 475 on the second CC is available for use, but that resource occasion 480 of the first CC is unavailable. Based on the identified availability indicator, the UE may perform data transmissions to the base station during resource occasion 475 (e.g., PUSCH) on the second CC during the $X^{th}+1$ time interval 420. Again, the resource occasion 480 (which is unused during this time interval) may be unused or may be reassigned to another UE that is experiencing acceptable channel performance on the second CC.

Figure 5:
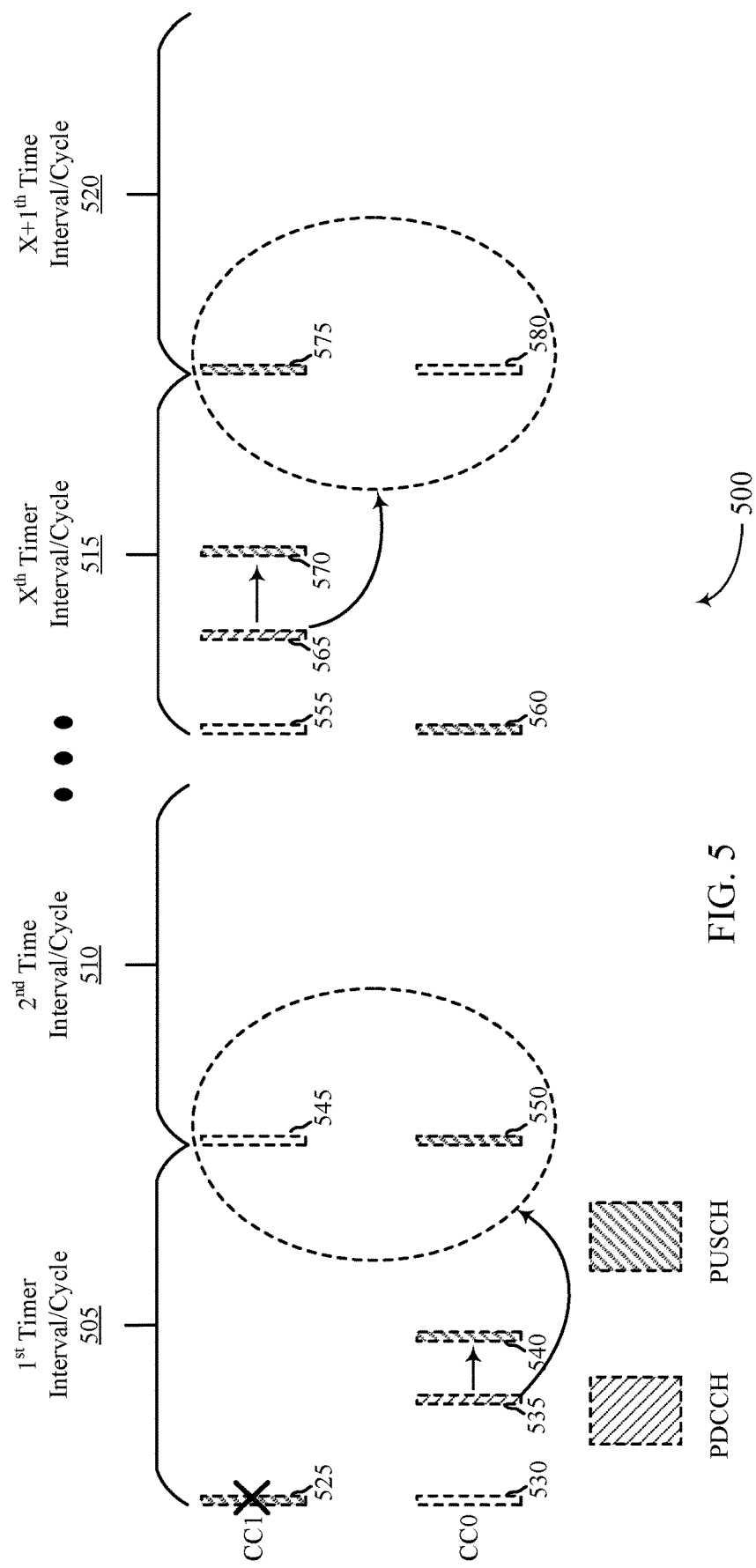
FIG. 5 illustrates an example of a multi-CC configuration that supports low overhead CC selection for multi-CC communication in accordance with aspects of the present disclosure.

FIG. 5 illustrates an example of a multi-CC configuration 500 that supports low overhead CC selection for multi-CC communication in accordance with aspects of the present disclosure. In some examples, multi-CC configuration 500 may implement aspects of wireless communication systems 100 and/or 200 and/or multi-CC configurations 300 and/or 400. Aspects of multi-CC configuration 500 may be implemented by a base station and/or UE, which may be examples of the corresponding devices described herein.

Broadly, multi-CC configuration 500 illustrates an example where, besides using a dedicated DCI, the multi-CC configured grant (e.g., the semi-persistent resource allocation on a plurality of CCs) suspension and in-use may be implied by the CC(s) selected by a DCI scheduling a retransmission for a configured grant. That is, if a CC is selected in the DCI for a retransmission, the corresponding configured grant (e.g., a subset of the resources of the semi-persistent resource allocation) is in-use. In some aspects, besides using (re)activation DCI, at least some of the parameters of a configured grant can be updated by a DCI scheduling the retransmission, e.g., the number of resource blocks.

The base station may use control signaling that configures the UE with a plurality of CCs (e.g., a first CC, CC0, and a second CC, CC1) for communicating with the base station and a semi-persistent resource allocation of a resource (e.g., time, frequency, spatial, code, etc., resources during corresponding resource occasions) in a plurality of time intervals (or cycles, with the first time interval 505, a second time interval 510, an $X^{th}$ time interval 515, and an $X^{th}+1$ time interval 520 being shown by way of example only) for each CC. Broadly, each of the time intervals may be subframes having a plurality of slots (with the slots not being shown for ease of reference). In some examples, the first CC (e.g., CC0) may be in FR1 and have a SCS of 60 kHz and the second CC (e.g., CC1) may be in FR2 and have a SCS of 120 kHz. However, it is to be understood that this is one example only of how the first and second CCs may be implemented. In other examples, the first CC and the second CC may be implemented on the same FR and/or may have the same SCS values such that the respective slots may have the same duration.

As discussed, the base station may configure the UE for communications using a plurality of CCs and a semi-persistent resource allocation of a resource for each CC. The semi-persistent resource allocation may correspond to a configured grant (e.g., for uplink transmissions) and/or an SPS (e.g., for downlink transmissions). However, according to aspects of the described techniques an availability indicator may be used to indicate the availability of the resource(s) of the semi-persistent resource allocation on each CC. Accordingly, at least some (e.g., a subset) of the resources on each CC may be used (e.g., available) or unused (e.g., suspended or unavailable) for a given resource occasion within one or more of the time intervals.

For example, resource occasion 525 (e.g., PUSCH) may correspond to a resource of the semi-persistent resource allocation on the second CC in which the wireless communications are not successfully performed. For example, the UE may be unable to transmit on the resource (due to high priority packet arriving for transmission instead, for example) or the UE may perform the transmission but the base station may be unable to successfully decode the transmission using the resources of resource occasion 525 (due to poor channel performance on the second CC, for example). Resource occasion 530 (e.g., PUSCH) may correspond to an unused resource of the semi-persistent resource allocation for the first CC, e.g., no data transmission is provided during resource occasion 530 on the first CC.

The base station and/or UE may determine that at least some of the resources of the semi-persistent resource allocation may not be used. For example, the resources may be unused due to poor channel performance on one or more of the CCs, based on the respective device having no data to transmit, and the like. For example, the base station may monitor reference signal transmissions and determine which CC is performing better, e.g., which CC has a lower congestion level, has a lower interference level, has a higher available throughput level, etc. The base station may use this information to determine whether the first CC and/or the second CC are performing at an acceptable level, and select the better performing CC(s) to use for continued communications between the base station and the UE. In the example illustrated in FIG. 5, the base station may determine that the first CC (e.g., CC0) is performing better than the second CC (e.g., CC1) (or simply that the second CC is performing poorly or below an acceptable threshold) and, accordingly, determine to use one or more of the resource occasions on the first CC for communications with the UE. In the example illustrated in FIG. 5, the base station may determine that the second CC (e.g., CC1) is not performing at an acceptable performance level based on the lost PUSCH transmission at resource occasion 525.

Accordingly, during resource occasion 535 (e.g., PDCCH) the base station may transmit or otherwise convey an indication of an availability indicator that indicates the availability of a resource of the semi-persistent resource allocation on each CC of the plurality of CCs. For example, the base station may transmit a DCI during resource occasion 535 that uses a bit, a field, a bitmap, and the like, to indicate to the UE that resource occasion 550 (e.g., PUSCH) of the semi-persistent resource allocation on the first CC are available, but that resource occasion 545 (e.g., PUSCH) of the semi-persistent resource allocation on the second CC are unavailable. In some aspects, the availability indicators may identify the particular resource occasion and/or may simply identify which CC of the plurality of CCs (e.g., the first CC and/or the second CC) are available during the second time interval 510. However, in the example illustrated in FIG. 5, the DCI may only indicate that a retransmission of the PUSCH transmission at resource occasion 525 has been scheduled for resource occasion 540 on the first CC. In this example, scheduling the retransmission during resource occasion 540 on the first CC carries the availability indicator indicating that the resources of the first CC are available, but that the resources of the second CC are unavailable.

The UE may receive or otherwise identify the availability indicator and communicate the retransmission to the base station during the resource occasion 540 (and optionally during the resource occasion 550) of the semi-persistent resource allocation on the first CC (e.g., CC0).

As discussed above, the availability indicators may be valid indefinitely or for a time window (e.g., one or more of the time intervals). In the example illustrated in FIG. 5, the availability indicator is valid from the second time interval 510 until the $X^{th}$ time interval 515, including any intervening time intervals. However, this is only one example and different time windows (on a per-CC basis) may also be used. The time window may be measured (e.g., begin and/or end) based on a fixed time (e.g., an absolute time value) and/or based on a relative time (e.g., based on the timing of the occurrence of a particular event). In one example, the time window may begin at the beginning or end of the transmission identifying the availability indicator. For example, the time window may begin at the end of the resource occasion 535 and may end after resource occasions 555 and 560 of the $X^{th}$ time interval 515.

In some examples, the resource occasions 545 and 555 may be unused or may be reassigned to other UEs. For example, the base station may determine that another UE is experiencing acceptable channel performance on the second CC, and therefore dynamically allocate the resources of the resource occasion 545 and/or 555 to a different UE. Accordingly, the resource occasions 545 and 555 that were previously a resource of a semi-persistent resource allocation can be dynamically activated or deactivated (as in this case) based on the availability indicator.

During the $X^{th}$ time interval 515, the base station and/or UE may again perform CC selection (e.g., based on the channel performance of each CC). In the example illustrated in FIG. 5, the first CC may be experiencing poor channel performance and, therefore, the base station may determine to use the second CC (e.g., CC1) for continued communications with the UE using the resources of the semi-persistent resource allocation. For example, the base station and UE may communicate a data transmission during resource occasion 560, but may determine that the first CC is performing poorly based on the channel performance of the first CC during resource occasion 560. Accordingly, the base station may determine that the second CC (e.g., CC1) is performing better and select the second CC for subsequent communications with the UE.

Accordingly, during resource occasion 565 (e.g., PDCCH) the base station may again transmit or otherwise convey an availability indicators to the UE indicating that the resource occasion 570 on the second CC is available for use, but that resource occasion 580 of the first CC is unavailable. In some aspects, the DCI transmitted during resource occasion 565 may change one or more of the parameters of the resources of the semi-persistent resource allocation. For example, the DCI transmitted at resource occasion 565 may change the number of resource blocks for the resource, which may implicitly signal that the transmissions performed at resource occasions 570 and/or 575 are retransmissions.

Based on the identified availability indicator, the UE may perform data transmissions to the base station during resource occasions 570 and 575 (e.g., PUSCH) on the second CC during the $X^{th}$ time interval 515 and the $X^{th}+1$ time interval 520, respectively. As discussed, one or more of the data transmissions performed during resource occasions 570 and/or 575 may be new data transmissions or may be retransmissions. Again, the resource occasion 580 (which is unused during this time interval) may be unused or may be reassigned to another UE that is experiencing acceptable channel performance on the second CC.

Figure 6:
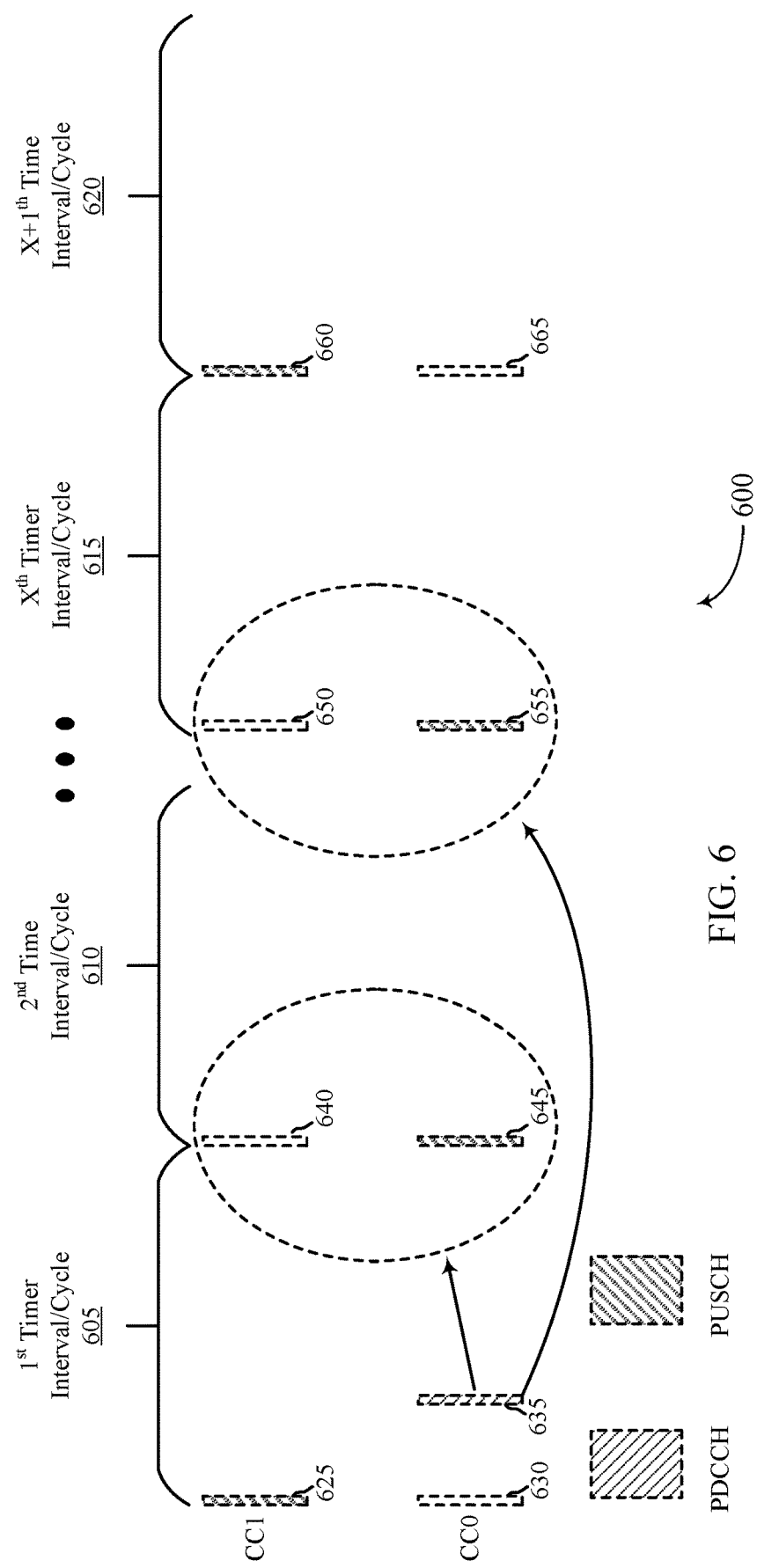
FIG. 6 illustrates an example of a multi-CC configuration that supports low overhead CC selection for multi-CC communication in accordance with aspects of the present disclosure.

FIG. 6 illustrates an example of a multi-CC configuration 600 that supports low overhead CC selection for multi-CC communication in accordance with aspects of the present disclosure. In some examples, multi-CC configuration 600 may implement aspects of wireless communication systems 100 and/or 200 and/or multi-CC configurations 300, 400, and/or 500. Aspects of multi-CC configuration 600 may be implemented by a base station and/or UE, which may be examples of the corresponding devices described herein.

Broadly, multi-CC configuration 600 illustrates an example where, instead of sending one DCI for every multi-CC configured grant status update (e.g., transmission of the availability indicator), the update indicated by the DCI can hold for a certain time window (e.g., X ms). After that time window, the multi-CC configured grant status update (e.g., the availability indicator for the semi-persistent resource allocation for each CC) may switch to a default status, which can be configured via higher layer signaling (e.g., RRC signaling, MAC CE signaling, and the like). Before the time window ends, another DCI can be sent for a new update if the base station determines the CC(s) used in the default status are still experiencing poor channel performance quality based on measurements, for example.

The base station may use control signaling that configures the UE with a plurality of CCs (e.g., a first CC, CC0, and a second CC, CC1) for communicating with the base station and a semi-persistent resource allocation of a resource (e.g., time, frequency, spatial, code, etc., resources during corresponding resource occasions) in a plurality of time intervals (or cycles, with the first time interval 605, a second time interval 610, an $X^{th}$ time interval 615, and an $X^{th}+1$ time interval 620 being shown by way of example only) for each CC. Broadly, each of the time intervals may be subframes having a plurality of slots (with the slots not being shown for ease of reference). In some examples, the first CC (e.g., CC0) may be in FR1 and have a SCS of 60 kHz and the second CC (e.g., CC1) may be in FR2 and have a SCS of 120 kHz. However, it is to be understood that this is one example only of how the first and second CCs may be implemented. In other examples, the first CC and the second CC may be implemented on the same FR and/or may have the same SCS values such that the respective slots may have the same duration.

As discussed, the base station may configure the UE for communications using a plurality of CCs and a semi-persistent resource allocation of a resource for each CC. The semi-persistent resource allocation may correspond to a configured grant (e.g., for uplink transmissions) and/or an SPS (e.g., for downlink transmissions). However, according to aspects of the described techniques an availability indicator may be used to indicate the availability of the resource(s) of the semi-persistent resource allocation on each CC. Accordingly, at least some (e.g., a subset) of the resources on each CC may be used (e.g., available) or unused (e.g., suspended or unavailable) for a given resource occasion within one or more of the time intervals.

For example, resource occasion 625 (e.g., PUSCH) may correspond to a resource of the semi-persistent resource allocation on the second CC in which the wireless communications are performed. Resource occasion 630 (e.g., PUSCH) may correspond to an unused resource of the semi-persistent resource allocation for the first CC, e.g., no data transmission is provided during resource occasion 630 on the first CC. In some aspects, the data transmissions configured for resource occasions 625 and 630 may be considered the default status. That is, the default status for the resources of the semi-persistent resource allocation on each CC may be that data transmissions are performed during the configured resource occasion(s) on the second CC, but the configured resource occasion(s) on the first CC are unused.

The base station and/or UE may determine that at least some of the resources of the semi-persistent resource allocation may not be used. For example, the resources may be unused due to poor channel performance on one or more of the CCs, based on the respective device having no data to transmit, and the like. For example, the base station may monitor reference signal and/or data transmissions and determine which CC is performing better, e.g., which CC has a lower congestion level, has a lower interference level, has a higher available throughput level, etc. The base station may use this information to determine whether the first CC and/or the second CC are performing at an acceptable level, and select the better performing CC(s) to use for continued communications between the base station and the UE. In the example illustrated in FIG. 6, the base station may determine that the first CC (e.g., CC0) is performing better than the second CC (e.g., CC1) (or simply that the second CC is performing poorly or below an acceptable threshold) and, accordingly, determine to use one or more of the resource occasions on the first CC for communications with the UE.

Accordingly, during resource occasion 635 (e.g., PDCCH) the base station may transmit or otherwise convey an indication of an availability indicator that indicates the availability of a resource of the semi-persistent resource allocation on each CC of the plurality of CCs. For example, the base station may transmit a DCI during resource occasion 635 that uses a bit, a field, a bitmap, and the like, to indicate to the UE that resource occasions 645 and 655 (e.g., PUSCH) of the semi-persistent resource allocation on the first CC are available, but that resource occasions 640 and 645 (e.g., PUSCH) of the semi-persistent resource allocation on the second CC are unavailable. In some aspects, the availability indicators may identify the particular resource occasion and/or may simply identify which CC of the plurality of CCs (e.g., the first CC and/or the second CC) are available during the subsequent time intervals. In some aspects, the time window may be indicated in the DCI and/or configured by higher layer signaling (e.g., RRC signaling, MAC CE signaling, etc.). In some aspects, the time window may automatically expire after a configured duration and/or the expiration of the time window may be signaled in the DCI.

In some aspects, the availability indicators may be valid for a time window (e.g., one or more of the time intervals). In the example illustrated in FIG. 6, the availability indicator is valid from the second time interval 610 until the $X^{th}$ time interval 615, including any intervening time intervals. However, this is only one example and different time windows (on a per-CC basis) may also be used. The time window may be measured (e.g., begin and/or end) based on a fixed time (e.g., an absolute time value) and/or based on a relative time (e.g., based on the timing of the occurrence of a particular event). In one example, the time window may begin at the beginning or end of the transmission identifying the availability indicator. For example, the time window may begin at the end of the resource occasion 635 and may end after resource occasions 650 and 655 of the $X^{th}$ time interval 615.

The UE may receive or otherwise identify the availability indicator and communicate a data transmission with a base station during the resource occasions 645 and 655 of the semi-persistent resource allocation on the first CC (e.g., CC0).

In some examples, the resource occasions 640 and 650 may be unused or may be reassigned to other UEs. For example, the base station may determine that another UE is experiencing acceptable channel performance on the second CC, and therefore dynamically allocate the resources of the resource occasion 640 and/or 650 to a different UE. Accordingly, the resource occasions 640 and 650 that were previously a resource of a semi-persistent resource allocation can be dynamically activated or deactivated (as in this case) based on the availability indicator.

After the $X^{th}$ time interval 615, the time window may automatically expire and, based on the expiration, the base station and UE may switch back to the default status where resource occasion 660 on the second CC is available for use and resource occasion 665 on the first CC is unavailable for use (e.g., suspended) during the $X^{th}$+1 time interval 620. Accordingly, in the example illustrated in FIG. 6, the base station may determine to use the second CC (e.g., CC1) for continued communications with the UE using the resources of the semi-persistent resource allocation. However, this configuration for the resources of the semi-persistent resource allocation may be implemented automatically based on the expiration of the time window. Therefore, the DCI indicating the availability indicator may not be used and, instead, the UE may identify the availability indicator based on the expiration of the time window. Accordingly, the UE may identify that the resource occasion 660 on the second CC is available for use, but that resource occasion 655 of the first CC is unavailable. Based on the implicitly identified availability indicator, the UE may perform data transmissions to the base station during resource occasion 660 (e.g., PUSCH) on the second CC during the $X^{th}$+1 time interval 620. Again, the resource occasion 665 (which is unused during this time interval) may be unused or may be reassigned to another UE that is experiencing acceptable channel performance on the second CC.

Figure 7:
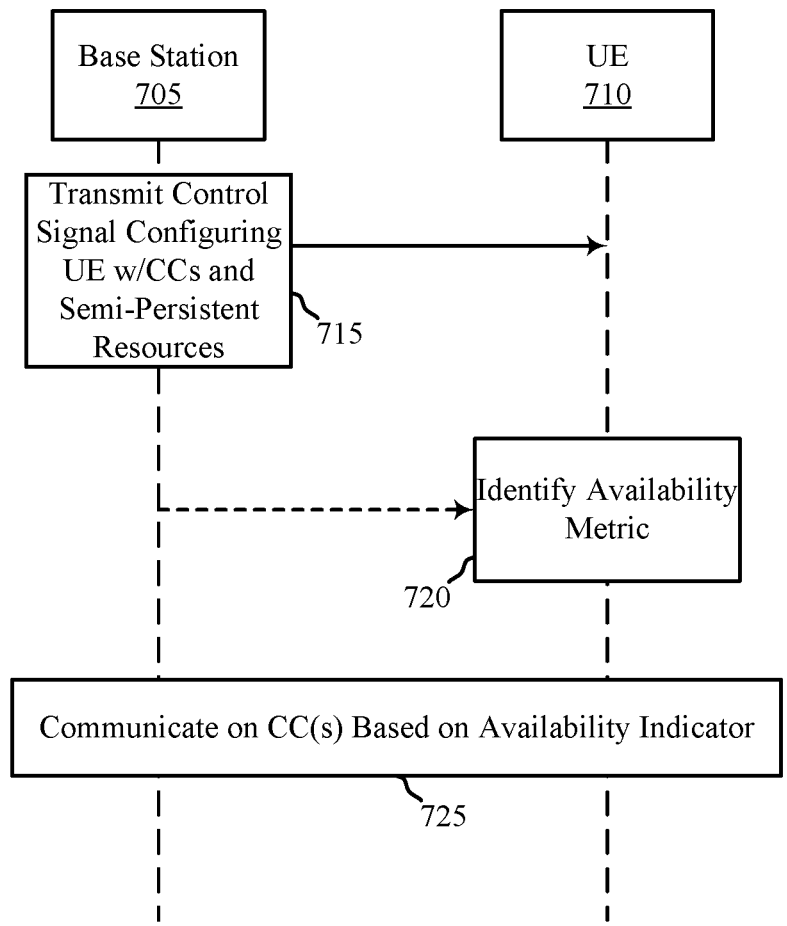
FIG. 7 illustrates an example of a process that supports low overhead CC selection for multi-CC communication in accordance with aspects of the present disclosure.

FIG. 7 illustrates an example of a process 700 that supports low overhead CC selection for multi-CC communication in accordance with aspects of the present disclosure. In some examples, process 700 may implement aspects of wireless communication systems 100 and/or 200, and/or multi-CC configurations 300, 400, 500, and/or 600. Aspects of process 700 may be implemented by base station 705 and/or UE 710, which may be examples of corresponding devices described herein.

At 715, base station 705 may transmit (and UE 710 may receive) control signaling configuring UE 710 with the plurality of CCs for communicating with base station 705 and a semi-persistent resource allocation of a resource for each CC of the plurality of CCs. In some aspects, the control signaling may be higher layer signaling, such as RRC signaling, MAC CE signaling, etc. In some aspects, the semi-persistent resource allocation may correspond to uplink resources (e.g., in a configured grant, in AUL resources, and the like) and/or downlink resources (e.g., in a configured grant, in SPS resources, and the like).

In some aspects, the control signaling may be explicitly signaled to UE 710 and/or may be implicit based on configured information. For example, a default status may automatically be implemented that indicates an availability of resource(s) of the semi-persistent resource allocation on a first CC, and an unavailability of resource(s) of the semi-persistent resource allocation on a second CC, or vice versa.

At 720, UE 710 may identify an availability indicator that indicates availability of the resource of the semi-persistent resource allocation on each CC of the plurality of CCs. In one example, this may optionally include base station 705 transmitting (and UE 710 receiving) a DCI that carries or conveys the availability indicator explicitly and/or implicitly. For example, the DCI may explicitly convey the availability indicator using a bit, a bitmap, a field, and the like, within the DCI. In another example, the DCI may implicitly convey the availability indicator by configuring a retransmission, by changing one or more parameters of the resource of the semi-persistent resource allocation (e.g., for a retransmission), and the like.

Accordingly, in some aspects this may include base station 705 transmitting (and UE 710 receiving) the availability indicator as a bitmap that indicates the availability of the resource of the semi-persistent resource allocation on each CC of the plurality of CCs. In some aspects, this may include base station 705 transmitting (and UE 710 receiving) the availability indicator that indicates the resource is unavailable for a first CC of the plurality of CCs and that indicates the resources available for a second CC of the plurality of CCs. In some aspects, this may include the base station 705 transmitting (and UE 710 receiving) the availability indicated via a single CC or via two or more CCs of the plurality of CCs.

For example, UE 710 may determine that a retransmission is scheduled on a first CC, with the availability indicator identified to indicate that the resources available for communicating the data transmission on the first CC based on the determination that the retransmission is scheduled on the first CC. In some aspects, UE 710 may determine that the retransmission is scheduled based on the DCI being scrambled by a configured scheduling RNTI, based on a toggling state of a NDI, based on the scheduling of a particular HARQ process ID, and the like. In some aspects, one or more parameters of the semi-persistent resource allocation may be updated by a corresponding parameter indicated in the DCI that schedules the retransmission, e.g., the number of resource blocks for the retransmission may be updated.

In some aspects, UE 710 may determine that a retransmission is not scheduled for a first CC, where the availability indicator is identified to indicate that the resource is not available for communicating data transmission via this first CC based on the determination that the retransmission is not scheduled on the first CC.

At 725, base station 705 and UE 710 may communicate a data transmission via at least a subset of the plurality of CCs based, at least in some aspects, on the availability indicator. For example, base station 705 and UE 710 may perform one or more uplink transmissions and/or downlink transmission using the resources of the semi-persistent resource allocation indicated as available (e.g., based on the availability indicator) for each CC of the plurality of CCs.

Figure 8:
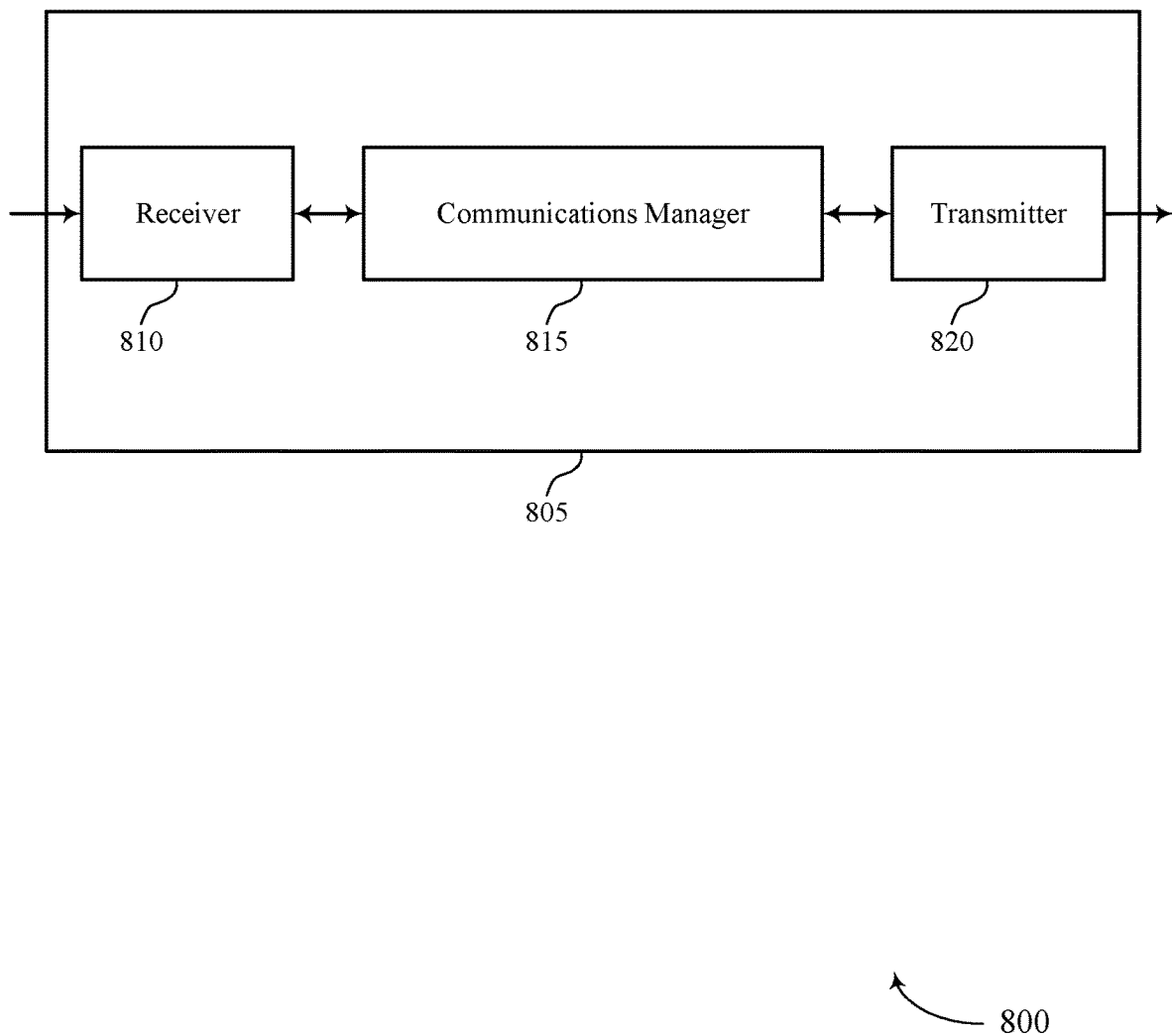
FIGS. 8 and 9 show block diagrams of devices that support low overhead CC selection for multi-CC communication in accordance with aspects of the present disclosure.

FIG. 8 shows a block diagram 800 of a device 805 that supports low overhead CC selection for multi-CC communication in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to low overhead CC selection for multi-CC communication, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive control signaling configuring the UE with a set of CCs (e.g., a plurality of CCs) for communicating with a base station and a semi-persistent resource allocation of a resource for each CC of the set of CCs, identify an availability indicator that indicates availability of the resource of the semi-persistent resource allocation on each CC of the set of CCs, and communicate a data transmission via at least a subset of the set of CCs based on the availability indicator. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
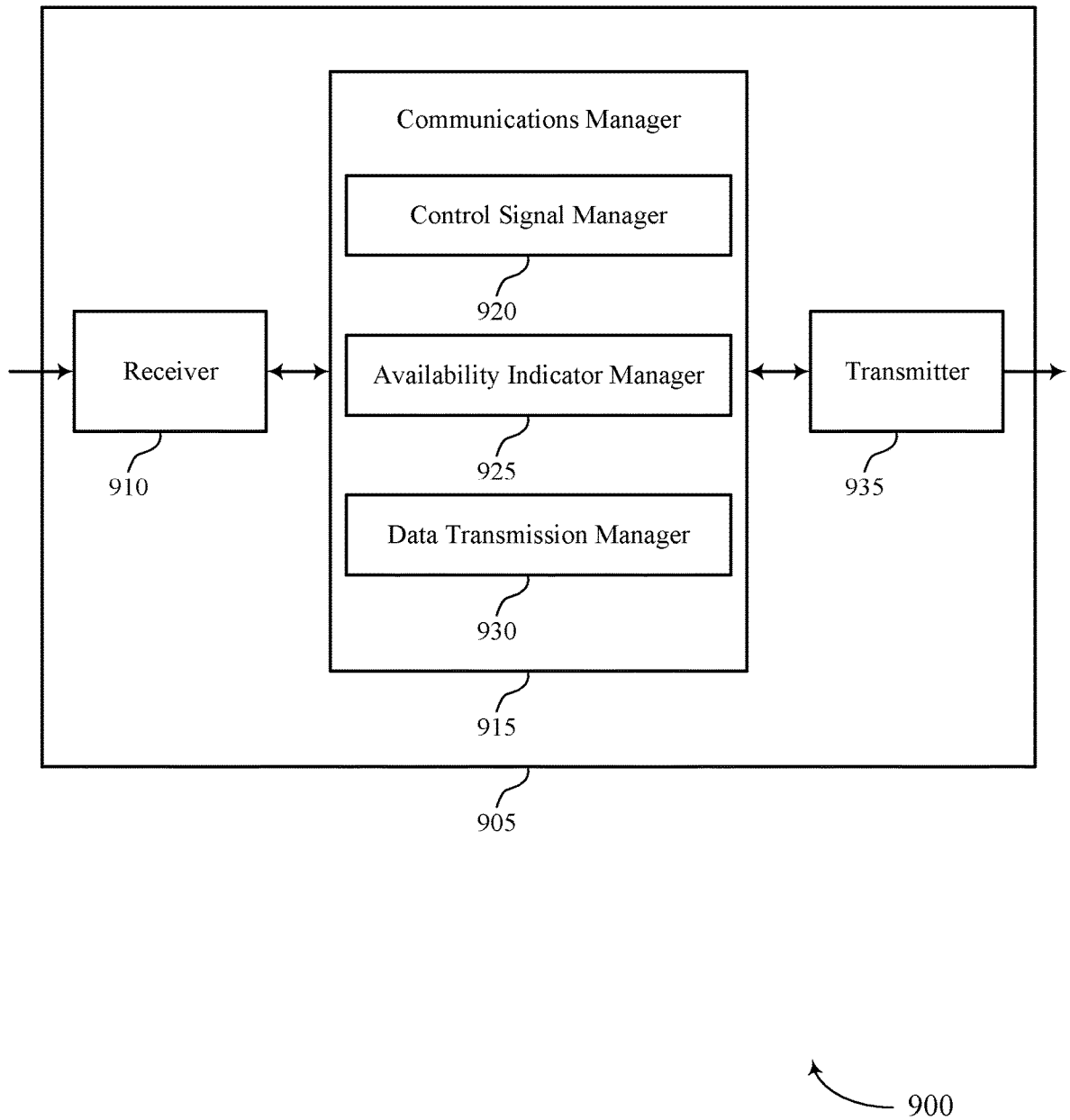

FIG. 9 shows a block diagram 900 of a device 905 that supports low overhead CC selection for multi-CC communication in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to low overhead CC selection for multi-CC communication, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control signal manager 920, an availability indicator manager 925, and a data transmission manager 930. The communications manager 915 may be an example of aspects of the communications manager 1110 described herein.

The control signal manager 920 may receive control signaling configuring the UE with a set of CCs for communicating with a base station and a semi-persistent resource allocation of a resource for each CC of the set of CCs.

The availability indicator manager 925 may identify an availability indicator that indicates availability of the resource of the semi-persistent resource allocation on each CC of the set of CCs.

The data transmission manager 930 may communicate a data transmission via at least a subset of the set of CCs based on the availability indicator.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
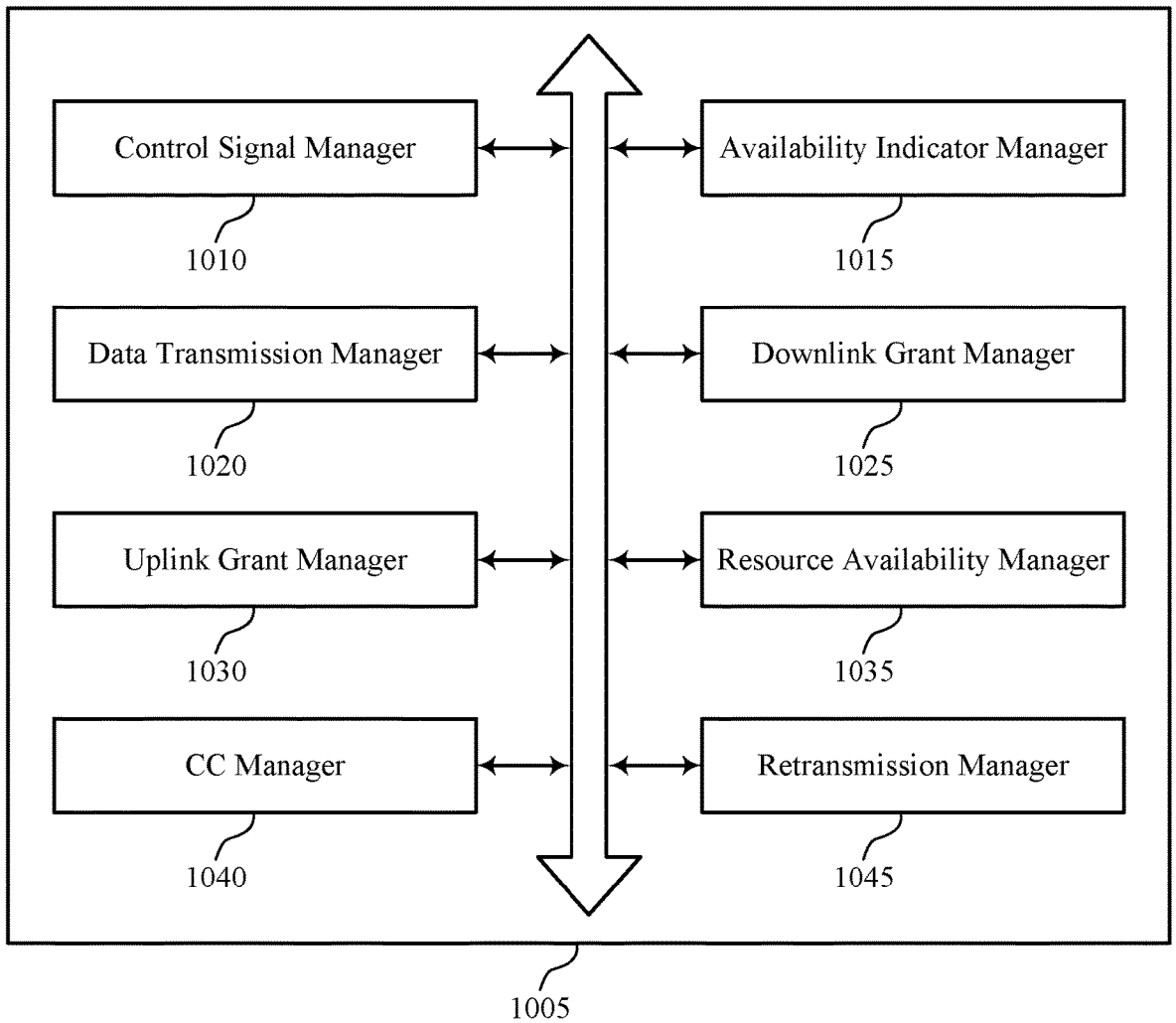
FIG. 10 shows a block diagram of a communications manager that supports low overhead CC selection for multi-CC communication in accordance with aspects of the present disclosure.

FIG. 10 shows a block diagram 1000 of a communications manager 1005 that supports low overhead CC selection for multi-CC communication in accordance with aspects of the present disclosure. The communications manager 1005 may be an example of aspects of a communications manager 815, a communications manager 915, or a communications manager 1110 described herein. The communications manager 1005 may include a control signal manager 1010, an availability indicator manager 1015, a data transmission manager 1020, a downlink grant manager 1025, an uplink grant manager 1030, a resource availability manager 1035, a CC manager 1040, and a retransmission manager 1045. Each of these modules may communicate, directly or indirectly, with one another (e.g., via one or more buses).

The control signal manager 1010 may receive control signaling configuring the UE with a set of CCs for communicating with a base station and a semi-persistent resource allocation of a resource for each CC of the set of CCs.

The availability indicator manager 1015 may identify an availability indicator that indicates availability of the resource of the semi-persistent resource allocation on each CC of the set of CCs. In some cases, the availability indicator is valid for a time window. In some cases, the time window begins at an end of a transmission identifying the availability indicator. In some cases, the semi-persistent resource allocation includes resources configured for a configured grant for an uplink transmission.

The data transmission manager 1020 may communicate a data transmission via at least a subset of the set of CCs based on the availability indicator.

The downlink grant manager 1025 may receive downlink control information including the availability indicator. In some cases, the semi-persistent resource allocation includes resources configured for a configured grant for a downlink transmission.

The uplink grant manager 1030 may receive the availability indicator as a bit map that indicates the availability of the resource of the semi-persistent resource allocation on each CC of the set of CCs.

The resource availability manager 1035 may receive the availability indicator that indicates the resource is unavailable for a first CC of the set of CCs and that indicates the resource is available for a second CC of the set of CCs.

The CC manager 1040 may receive the availability indicator via a single CC of the set of CCs. In some examples, the CC manager 1040 may receive the availability indicator via two or more CCs of the set of CCs.

The retransmission manager 1045 may determine that a retransmission is scheduled on a first CC of the set of CCs, where the availability indicator is identified to indicate that the resource is available for communicating the data transmission via the first CC based on determining that the retransmission is scheduled on the first CC.

In some examples, the retransmission manager 1045 may determine that the retransmission is scheduled based on at least one of a scrambling of downlink control information by a configured scheduling radio network temporary identifier, a toggling state of a new data indicator, a scheduling of a hybrid automatic repeat request process identifier, or any combination thereof.

In some examples, the retransmission manager 1045 may determine a retransmission is not scheduled for a first CC of the set of CCs, where the availability indicator is identified to indicate that the resource is not available for communicating the data transmission via the first CC based on determining that the retransmission is not scheduled. In some cases, at least one parameter of the semi-persistent resource allocation is updated by a corresponding parameter indicated in downlink control information that schedules the retransmission. In some cases, the at least one parameter includes a number of resource blocks.

Figure 11:
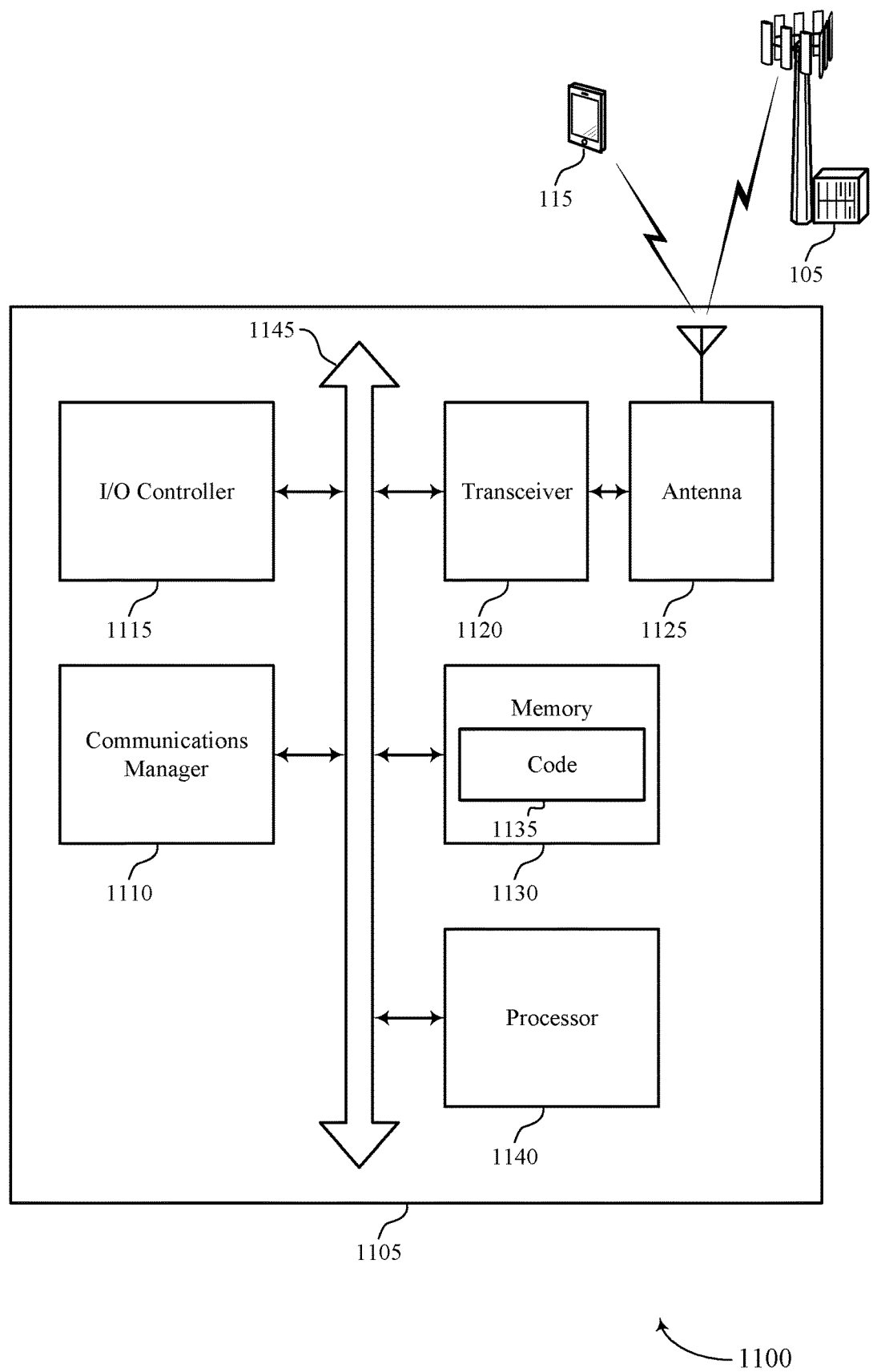
FIG. 11 shows a diagram of a system including a device that supports low overhead CC selection for multi-CC communication in accordance with aspects of the present disclosure.

FIG. 11 shows a diagram of a system 1100 including a device 1105 that supports low overhead CC selection for multi-CC communication in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive control signaling configuring the UE with a set of CCs for communicating with a base station and a semi-persistent resource allocation of a resource for each CC of the set of CCs, identify an availability indicator that indicates availability of the resource of the semi-persistent resource allocation on each CC of the set of CCs, and communicate a data transmission via at least a subset of the set of CCs based on the availability indicator.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting low overhead CC selection for multi-CC communication).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
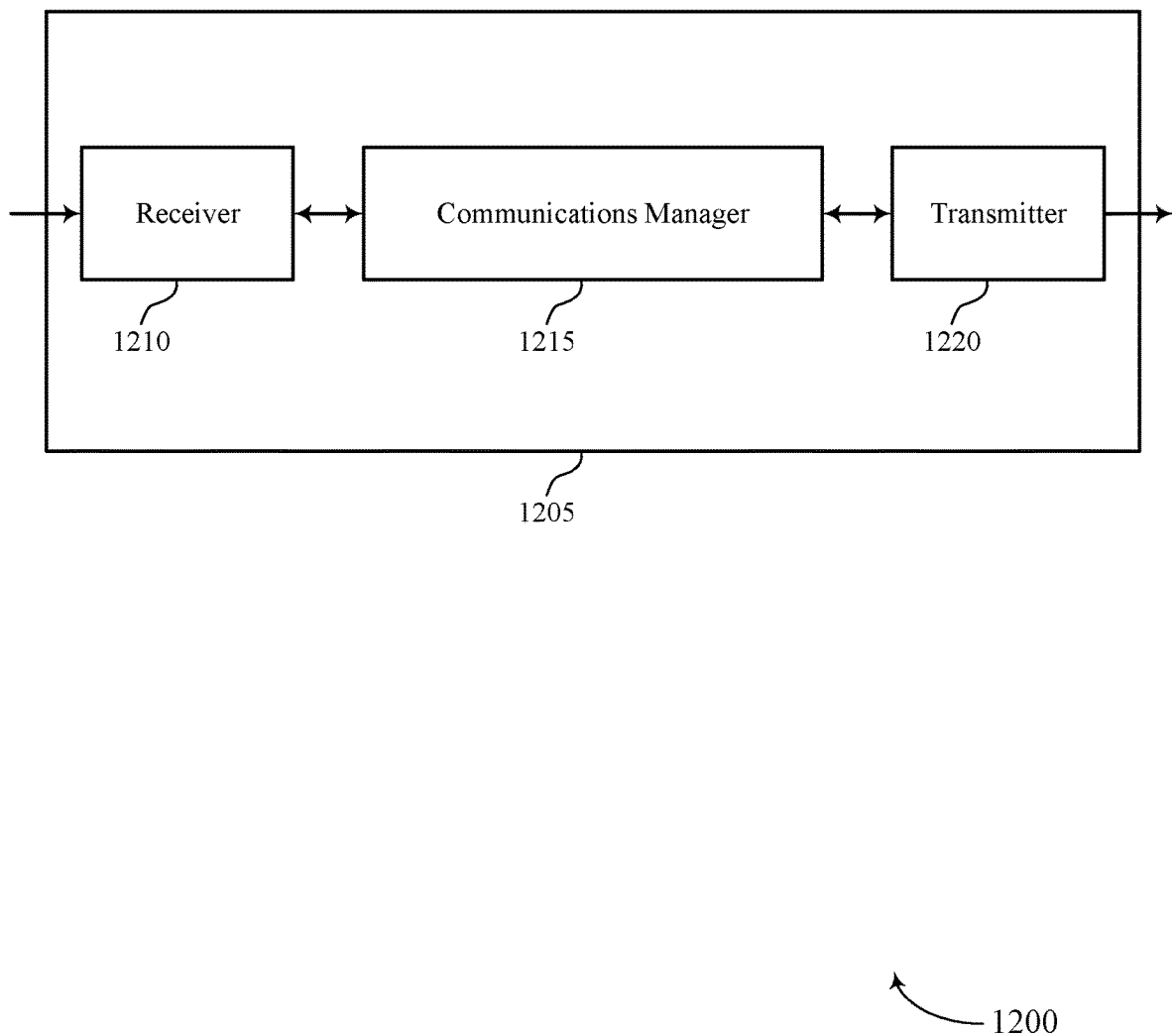
FIGS. 12 and 13 show block diagrams of devices that support low overhead CC selection for multi-CC communication in accordance with aspects of the present disclosure.

FIG. 12 shows a block diagram 1200 of a device 1205 that supports low overhead CC selection for multi-CC communication in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to low overhead CC selection for multi-CC communication, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit control signaling configuring a UE with a set of CCs for communicating with the base station and a semi-persistent resource allocation of a resource, transmit an availability indicator that indicates availability of the resource of the semi-persistent resource allocation on each CC of the set of CCs, and communicate a data transmission via at least a subset of the set of CCs based on the availability indicator. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
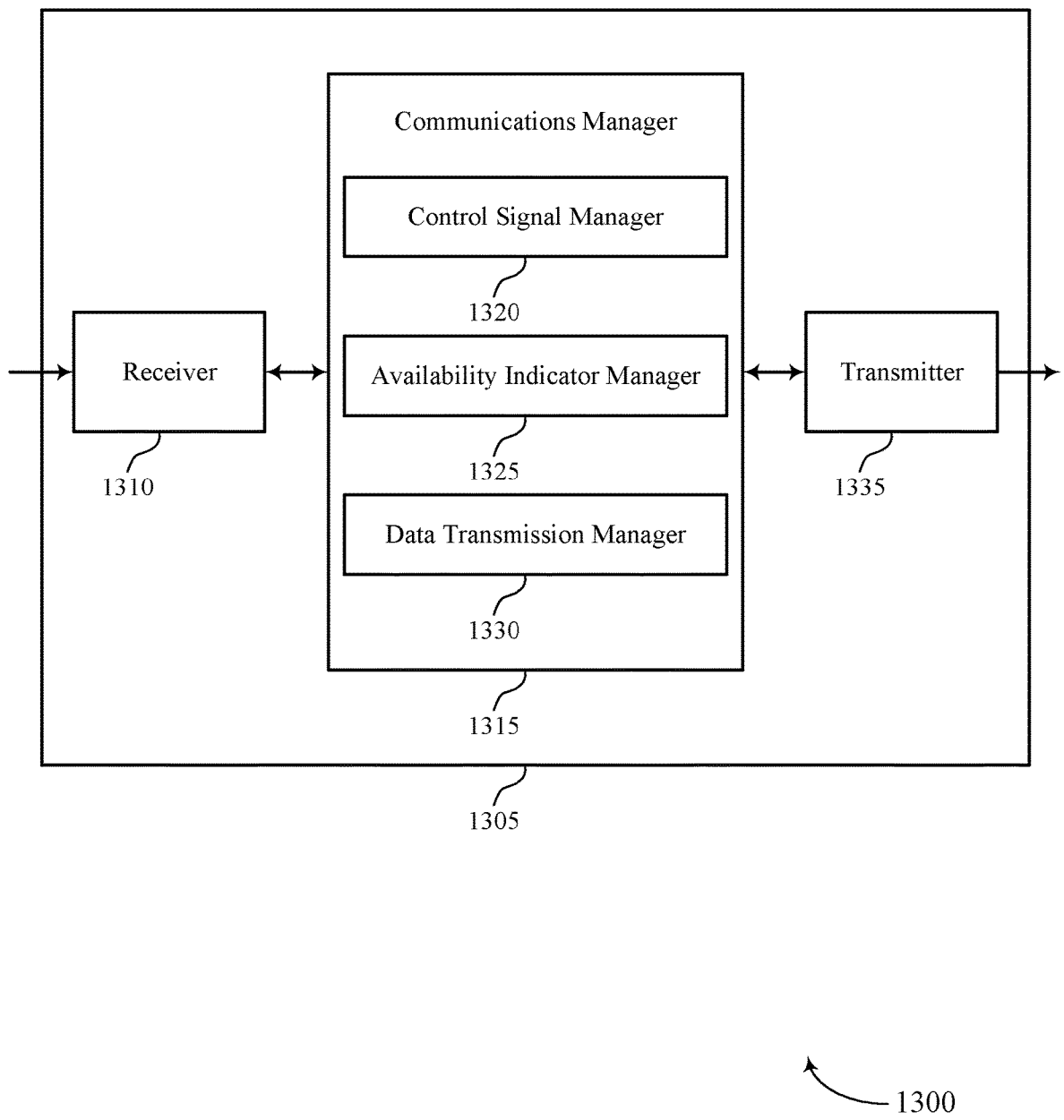

FIG. 13 shows a block diagram 1300 of a device 1305 that supports low overhead CC selection for multi-CC communication in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to low overhead CC selection for multi-CC communication, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a control signal manager 1320, an availability indicator manager 1325, and a data transmission manager 1330. The communications manager 1315 may be an example of aspects of the communications manager 1510 described herein.

The control signal manager 1320 may transmit control signaling configuring a UE with a set of CCs for communicating with the base station and a semi-persistent resource allocation of a resource.

The availability indicator manager 1325 may transmit an availability indicator that indicates availability of the resource of the semi-persistent resource allocation on each CC of the set of CCs.

The data transmission manager 1330 may communicate a data transmission via at least a subset of the set of CCs based on the availability indicator.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
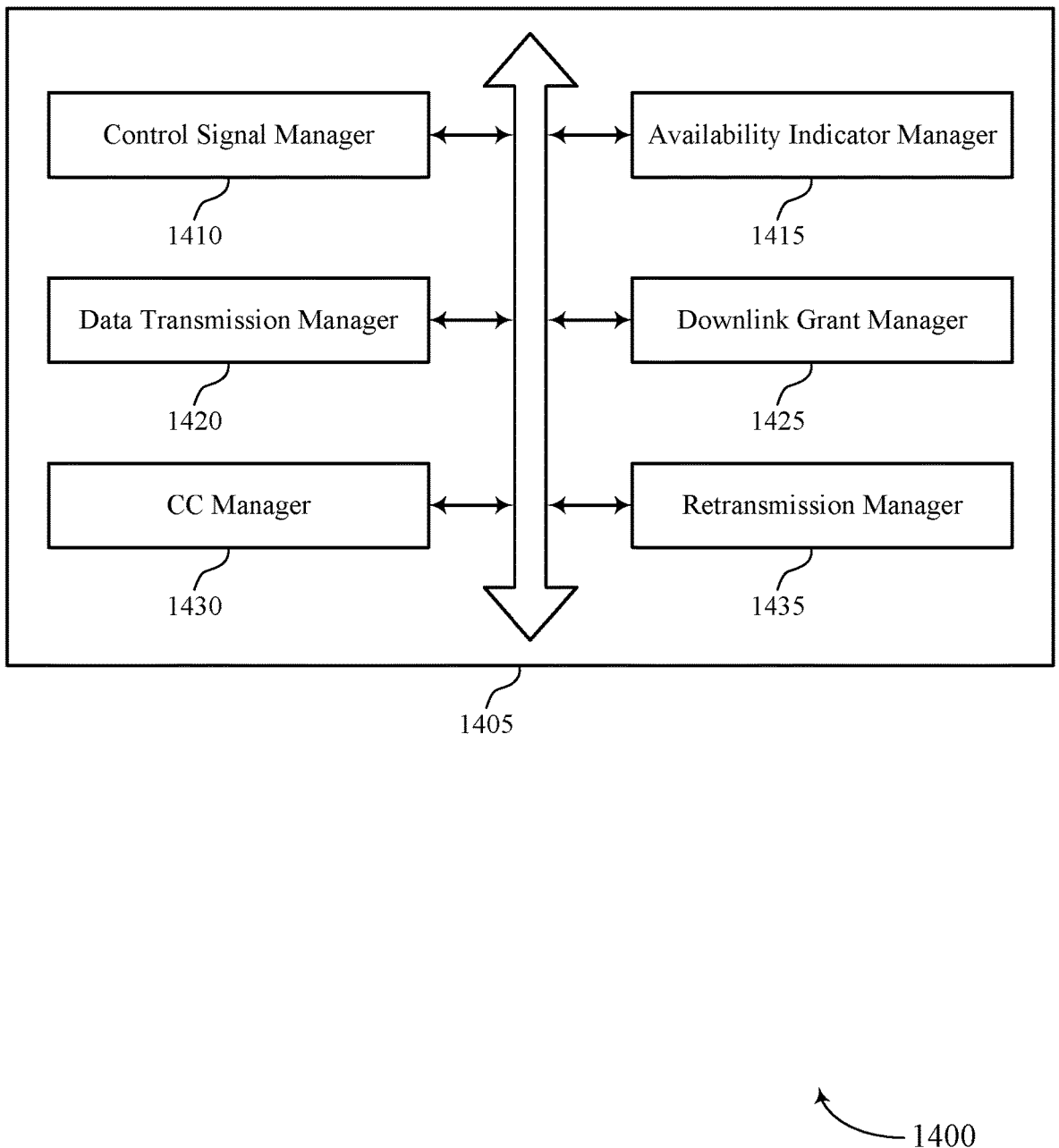
FIG. 14 shows a block diagram of a communications manager that supports low overhead CC selection for multi-CC communication in accordance with aspects of the present disclosure.

FIG. 14 shows a block diagram 1400 of a communications manager 1405 that supports low overhead CC selection for multi-CC communication in accordance with aspects of the present disclosure. The communications manager 1405 may be an example of aspects of a communications manager 1215, a communications manager 1315, or a communications manager 1510 described herein. The communications manager 1405 may include a control signal manager 1410, an availability indicator manager 1415, a data transmission manager 1420, a downlink grant manager 1425, a CC manager 1430, and a retransmission manager 1435. Each of these modules may communicate, directly or indirectly, with one another (e.g., via one or more buses).

The control signal manager 1410 may transmit control signaling configuring a UE with a set of CCs for communicating with the base station and a semi-persistent resource allocation of a resource.

The availability indicator manager 1415 may transmit an availability indicator that indicates availability of the resource of the semi-persistent resource allocation on each CC of the set of CCs. In some examples, the availability indicator manager 1415 may transmit the availability indicator as a bit map that indicates the availability of the resource of the semi-persistent resource allocation on each CC of the set of CCs. In some cases, the availability indicator is valid for a time window. In some cases, the availability indicator begins at an end of the transmission of the availability indicator. In some cases, the semi-persistent resource allocation includes resources configured for a configured grant for an uplink transmission. In some cases, the semi-persistent resource allocation includes resources configured for a configured grant for a downlink transmission.

The data transmission manager 1420 may communicate a data transmission via at least a subset of the set of CCs based on the availability indicator.

The downlink grant manager 1425 may transmit downlink control information including the availability indicator.

The CC manager 1430 may transmit the availability indicator that indicates the resource is unavailable for a first CC of the set of CCs and that indicates the resource is available for a second CC of the set of CCs. In some examples, the CC manager 1430 may transmit the availability indicator via a single CC of the set of CCs. In some examples, the CC manager 1430 may transmit the availability indicator via two or more CCs of the set of CCs. In some examples, the CC manager 1430 may transmit downlink control information that updates at least one parameter of semi-persistent resource allocation.

The retransmission manager 1435 may transmit downlink control information that schedules a retransmission of the data transmission.

Figure 15:
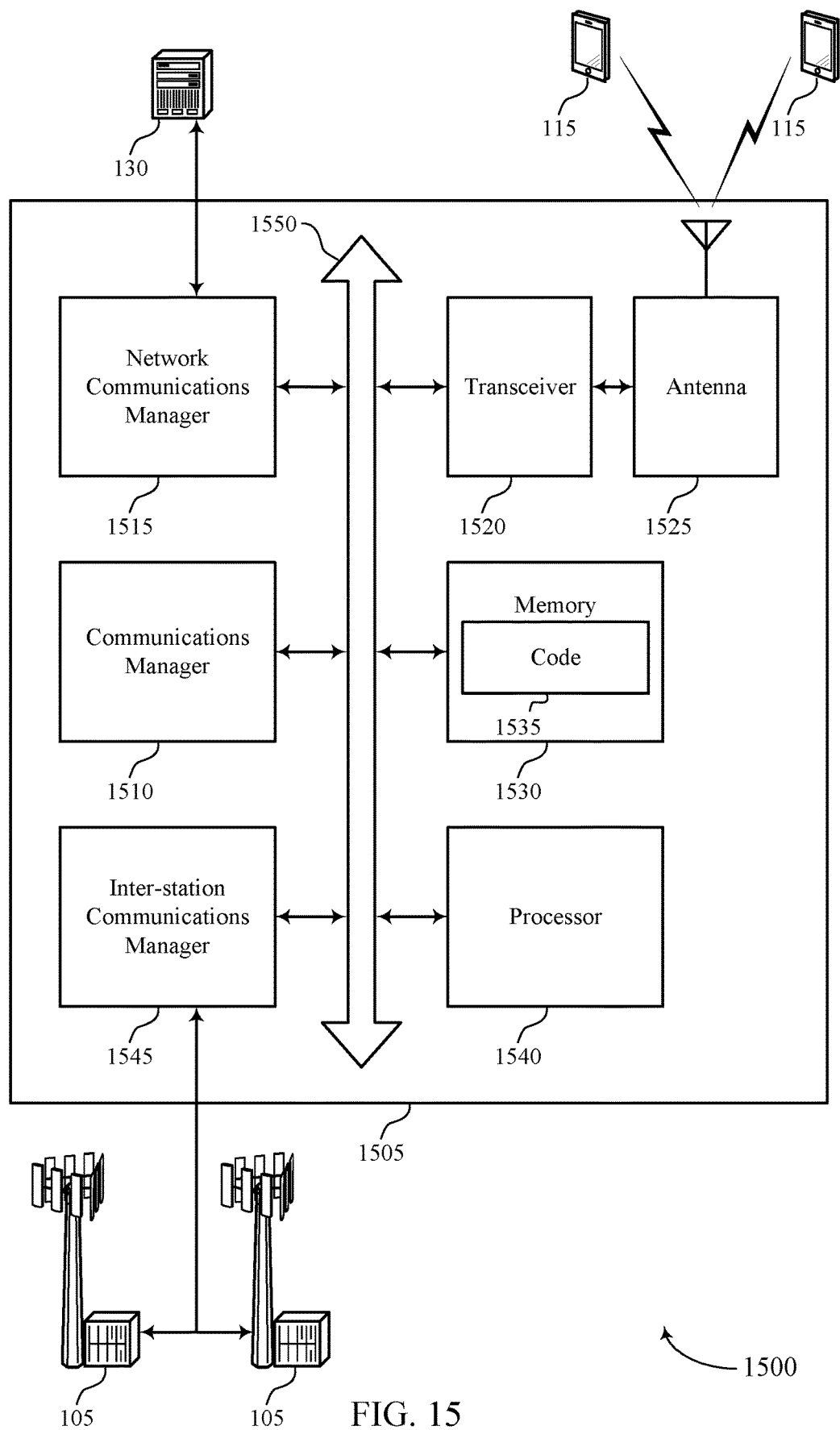
FIG. 15 shows a diagram of a system including a device that supports low overhead CC selection for multi-CC communication in accordance with aspects of the present disclosure.

FIG. 15 shows a diagram of a system 1500 including a device 1505 that supports low overhead CC selection for multi-CC communication in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit control signaling configuring a UE with a set of CCs for communicating with the base station and a semi-persistent resource allocation of a resource, transmit an availability indicator that indicates availability of the resource of the semi-persistent resource allocation on each CC of the set of CCs, and communicate a data transmission via at least a subset of the set of CCs based on the availability indicator.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting low overhead CC selection for multi-CC communication).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
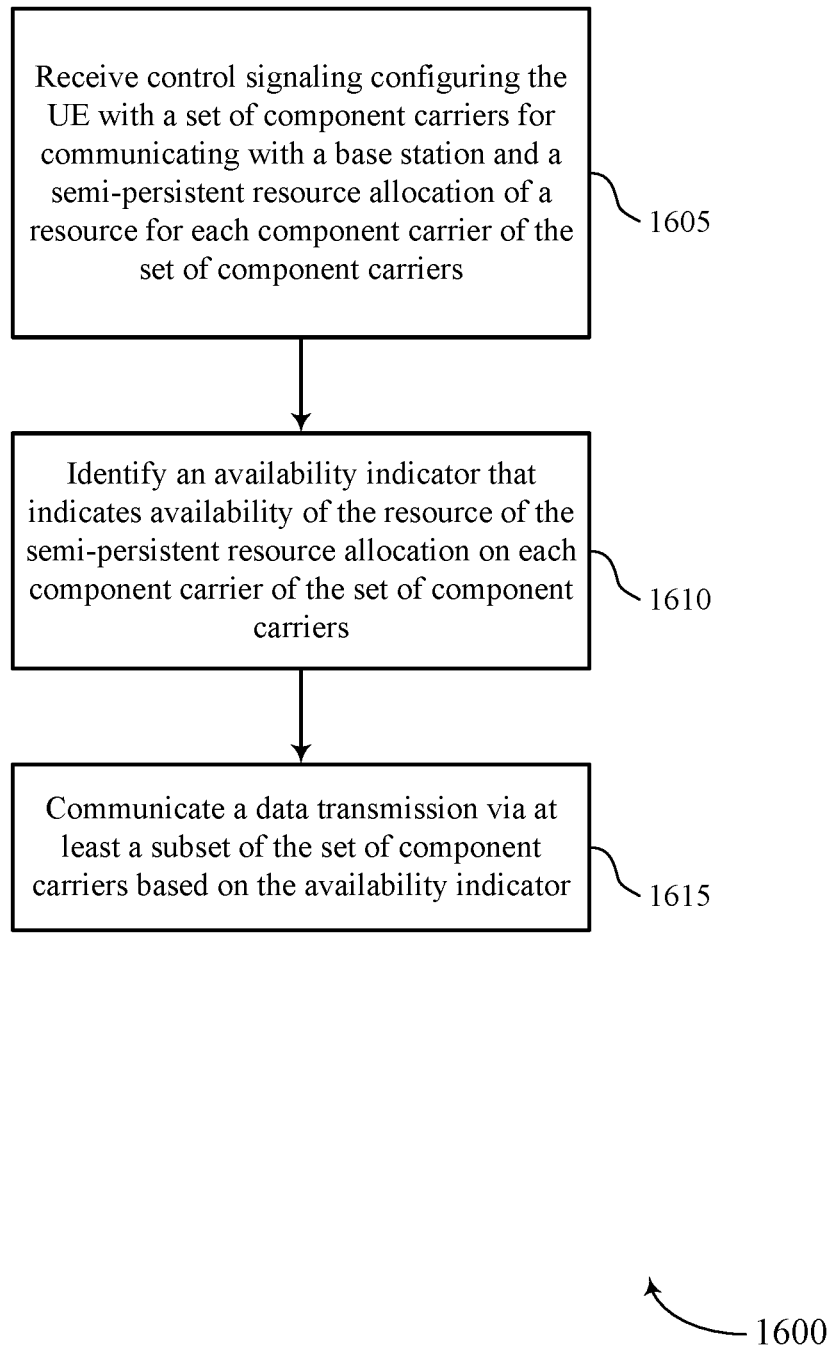
FIGS. 16 through 20 show flowcharts illustrating methods that support low overhead CC selection for multi-CC communication in accordance with aspects of the present disclosure.

FIG. 16 shows a flowchart illustrating a method 1600 that supports low overhead CC selection for multi-CC communication in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive control signaling configuring the UE with a set of CCs for communicating with a base station and a semi-persistent resource allocation of a resource for each CC of the set of CCs. The operations of 1605 may be performed according to the methods described herein. In some examples, aspects of the operations of 1605 may be performed by a control signal manager as described with reference to FIGS. 8 through 11.

At 1610, the UE may identify an availability indicator that indicates availability of the resource of the semi-persistent resource allocation on each CC of the set of CCs. The operations of 1610 may be performed according to the methods described herein. In some examples, aspects of the operations of 1610 may be performed by an availability indicator manager as described with reference to FIGS. 8 through 11.

At 1615, the UE may communicate a data transmission via at least a subset of the set of CCs based on the availability indicator. The operations of 1615 may be performed according to the methods described herein. In some examples, aspects of the operations of 1615 may be performed by a data transmission manager as described with reference to FIGS. 8 through 11.

Figure 17:
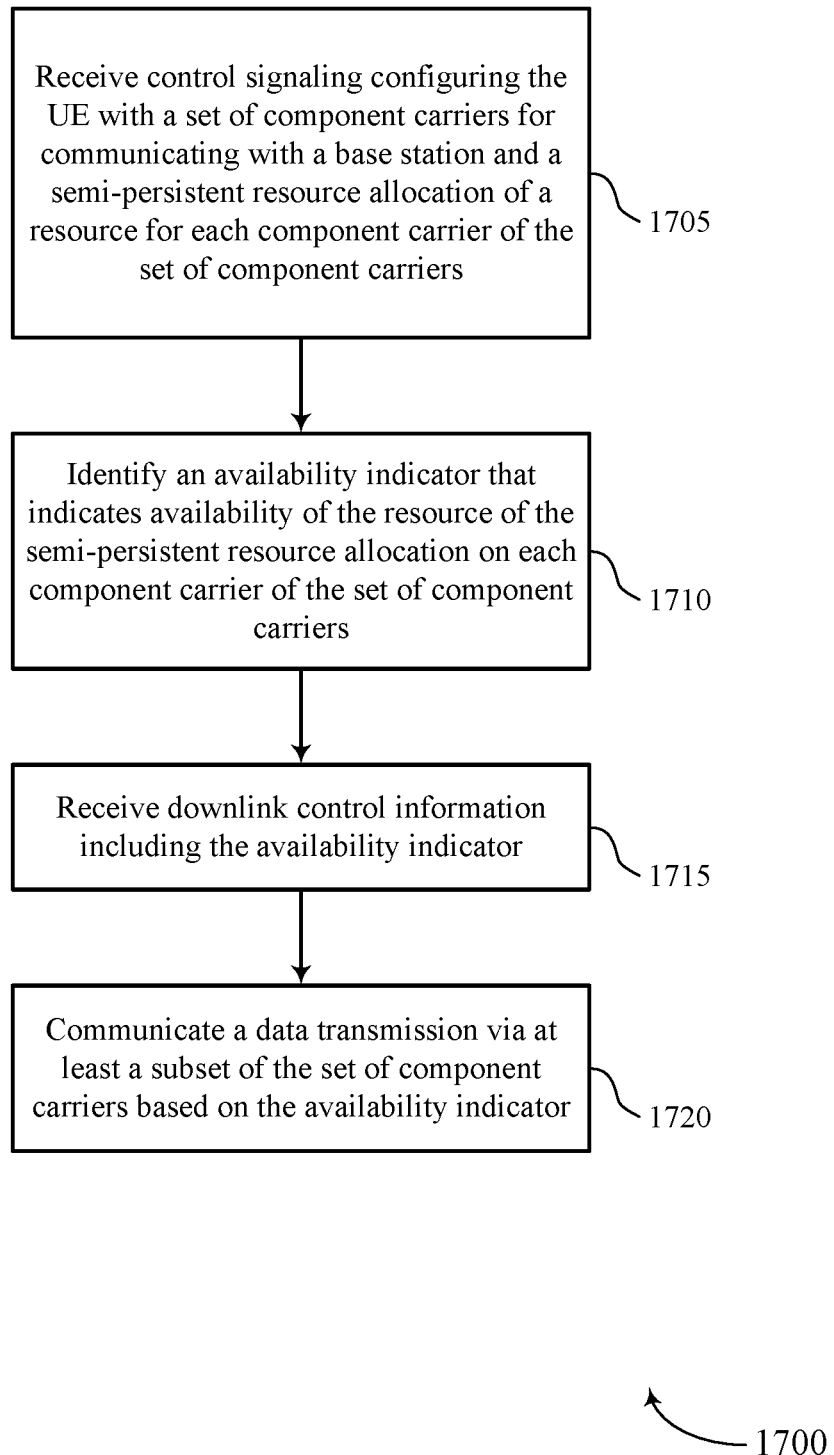

FIG. 17 shows a flowchart illustrating a method 1700 that supports low overhead CC selection for multi-CC communication in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive control signaling configuring the UE with a set of CCs for communicating with a base station and a semi-persistent resource allocation of a resource for each CC of the set of CCs. The operations of 1705 may be performed according to the methods described herein. In some examples, aspects of the operations of 1705 may be performed by a control signal manager as described with reference to FIGS. 8 through 11.

At 1710, the UE may identify an availability indicator that indicates availability of the resource of the semi-persistent resource allocation on each CC of the set of CCs. The operations of 1710 may be performed according to the methods described herein. In some examples, aspects of the operations of 1710 may be performed by an availability indicator manager as described with reference to FIGS. 8 through 11.

At 1715, the UE may receive downlink control information including the availability indicator. The operations of 1715 may be performed according to the methods described herein. In some examples, aspects of the operations of 1715 may be performed by a downlink grant manager as described with reference to FIGS. 8 through 11.

At 1720, the UE may communicate a data transmission via at least a subset of the set of CCs based on the availability indicator. The operations of 1720 may be performed according to the methods described herein. In some examples, aspects of the operations of 1720 may be performed by a data transmission manager as described with reference to FIGS. 8 through 11.

Figure 18:
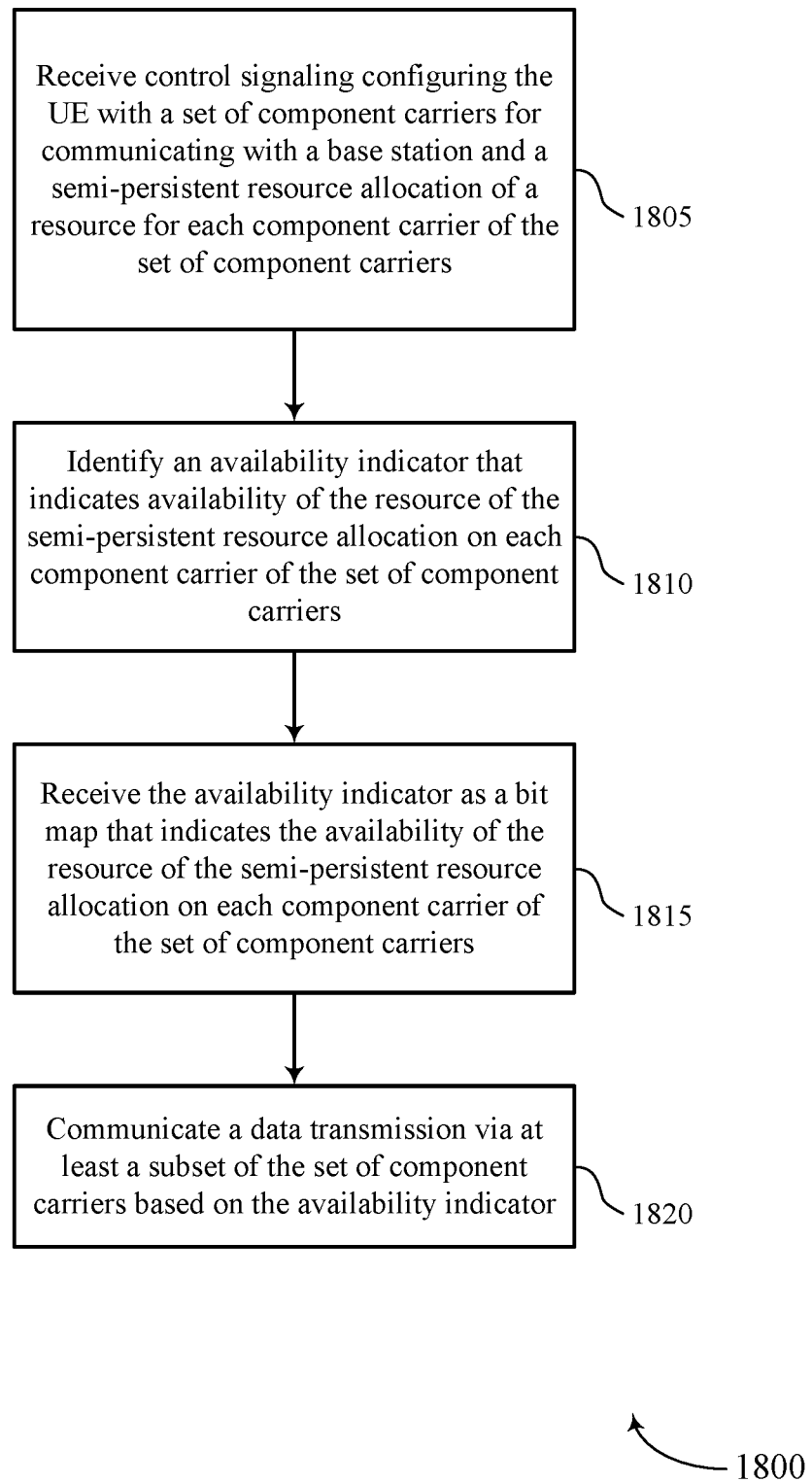

FIG. 18 shows a flowchart illustrating a method 1800 that supports low overhead CC selection for multi-CC communication in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive control signaling configuring the UE with a set of CCs for communicating with a base station and a semi-persistent resource allocation of a resource for each CC of the set of CCs. The operations of 1805 may be performed according to the methods described herein. In some examples, aspects of the operations of 1805 may be performed by a control signal manager as described with reference to FIGS. 8 through 11.

At 1810, the UE may identify an availability indicator that indicates availability of the resource of the semi-persistent resource allocation on each CC of the set of CCs. The operations of 1810 may be performed according to the methods described herein. In some examples, aspects of the operations of 1810 may be performed by an availability indicator manager as described with reference to FIGS. 8 through 11.

At 1815, the UE may receive the availability indicator as a bit map that indicates the availability of the resource of the semi-persistent resource allocation on each CC of the set of CCs. The operations of 1815 may be performed according to the methods described herein. In some examples, aspects of the operations of 1815 may be performed by an uplink grant manager as described with reference to FIGS. 8 through 11.

At 1820, the UE may communicate a data transmission via at least a subset of the set of CCs based on the availability indicator. The operations of 1820 may be performed according to the methods described herein. In some examples, aspects of the operations of 1820 may be performed by a data transmission manager as described with reference to FIGS. 8 through 11.

Figure 19:
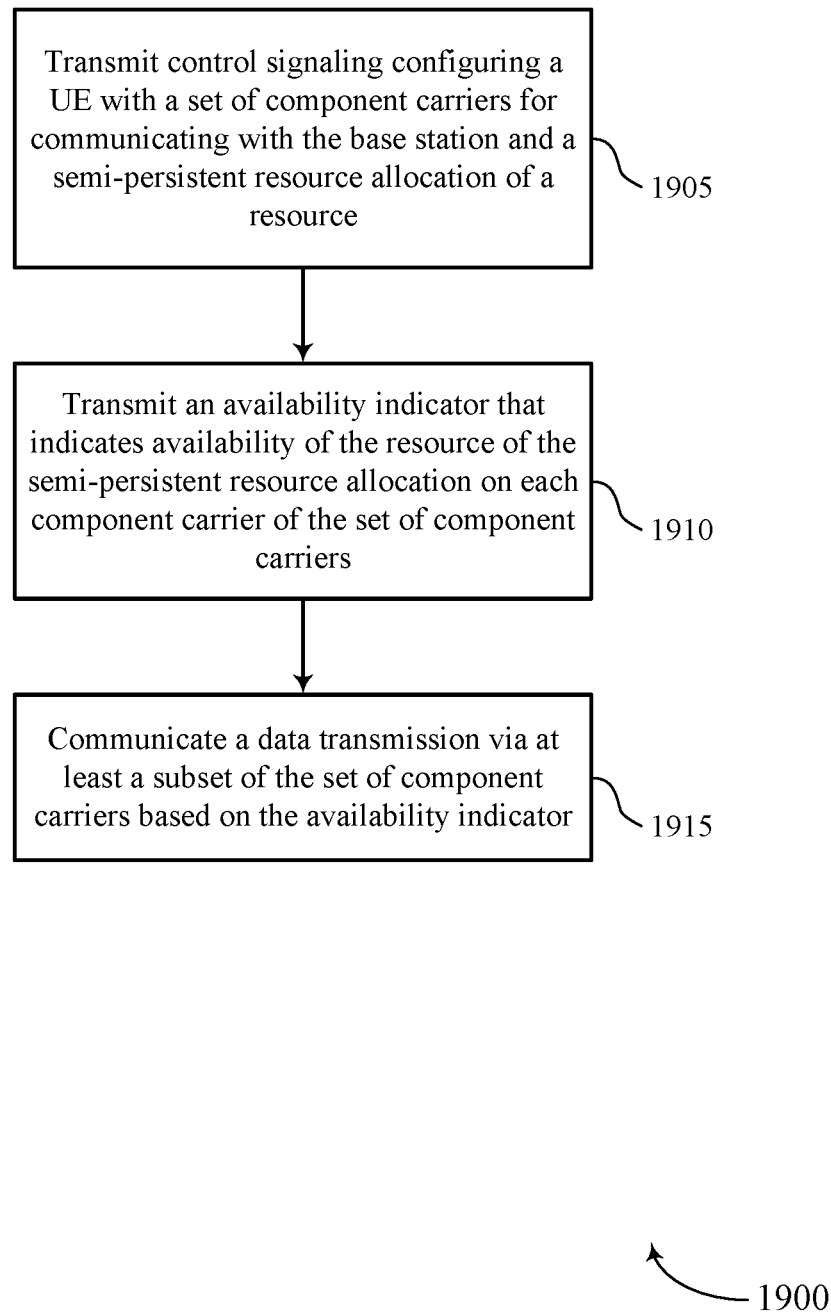

FIG. 19 shows a flowchart illustrating a method 1900 that supports low overhead CC selection for multi-CC communication in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit control signaling configuring a UE with a set of CCs for communicating with the base station and a semi-persistent resource allocation of a resource. The operations of 1905 may be performed according to the methods described herein. In some examples, aspects of the operations of 1905 may be performed by a control signal manager as described with reference to FIGS. 12 through 15.

At 1910, the base station may transmit an availability indicator that indicates availability of the resource of the semi-persistent resource allocation on each CC of the set of CCs. The operations of 1910 may be performed according to the methods described herein. In some examples, aspects of the operations of 1910 may be performed by an availability indicator manager as described with reference to FIGS. 12 through 15.

At 1915, the base station may communicate a data transmission via at least a subset of the set of CCs based on the availability indicator. The operations of 1915 may be performed according to the methods described herein. In some examples, aspects of the operations of 1915 may be performed by a data transmission manager as described with reference to FIGS. 12 through 15.

Figure 20:
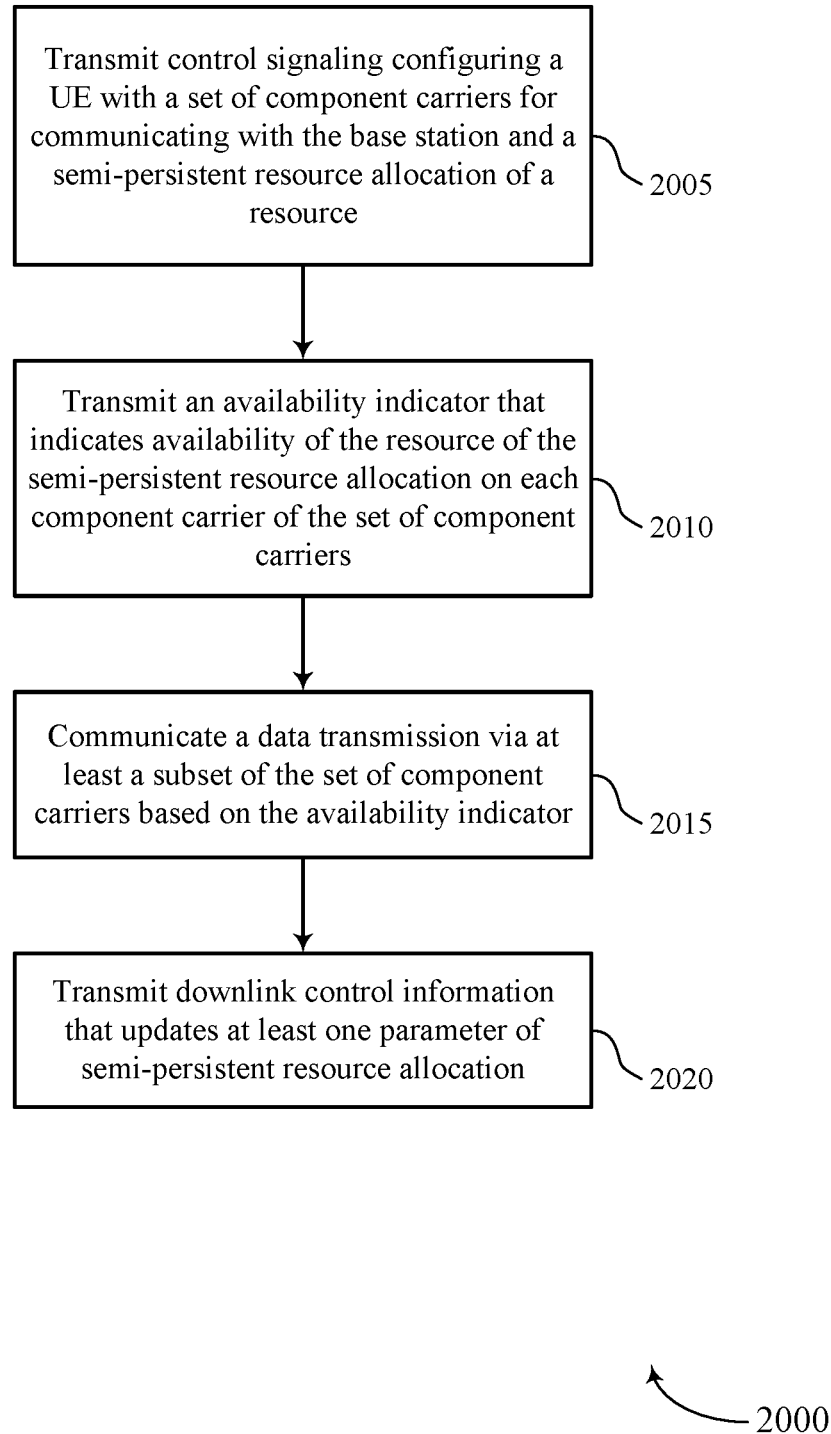

FIG. 20 shows a flowchart illustrating a method 2000 that supports low overhead CC selection for multi-CC communication in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit control signaling configuring a UE with a set of CCs for communicating with the base station and a semi-persistent resource allocation of a resource. The operations of 2005 may be performed according to the methods described herein. In some examples, aspects of the operations of 2005 may be performed by a control signal manager as described with reference to FIGS. 12 through 15.

At 2010, the base station may transmit an availability indicator that indicates availability of the resource of the semi-persistent resource allocation on each CC of the set of CCs. The operations of 2010 may be performed according to the methods described herein. In some examples, aspects of the operations of 2010 may be performed by an availability indicator manager as described with reference to FIGS. 12 through 15.

At 2015, the base station may communicate a data transmission via at least a subset of the set of CCs based on the availability indicator. The operations of 2015 may be performed according to the methods described herein. In some examples, aspects of the operations of 2015 may be performed by a data transmission manager as described with reference to FIGS. 12 through 15.

At 2020, the base station may transmit downlink control information that updates at least one parameter of semi-persistent resource allocation. The operations of 2020 may be performed according to the methods described herein. In some examples, aspects of the operations of 2020 may be performed by a CC manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving control signaling configuring the UE with a plurality of component carriers for communicating with a network device and a semi-persistent resource allocation of a resource for each component carrier of the plurality of component carriers;
   identifying an availability indicator that indicates availability of the resource of the semi-persistent resource allocation on each component carrier of the plurality of component carriers, wherein the availability indicator indicates a number of time intervals within a time window for which the availability indicator is valid; and
   communicating a data transmission via at least a subset of the plurality of component carriers based at least in part on the availability indicator.

2. The method of claim 1, wherein the time window begins at an end of a transmission identifying the availability indicator.

3. The method of claim 1, wherein identifying the availability indicator comprises:
   receiving downlink control information comprising the availability indicator.

4. The method of claim 1, wherein identifying the availability indicator comprises:
   receiving the availability indicator as a bit map that indicates the availability of the resource of the semi-persistent resource allocation on each component carrier of the plurality of component carriers.

5. The method of claim 1, wherein identifying the availability indicator comprises:
   receiving the availability indicator that indicates the resource is unavailable for a first component carrier of the plurality of component carriers and that indicates the resource is available for a second component carrier of the plurality of component carriers.

6. The method of claim 1, wherein identifying the availability indicator comprises:
   receiving the availability indicator via a single component carrier of the plurality of component carriers.

7. The method of claim 1, wherein identifying the availability indicator comprises:
   receiving the availability indicator via two or more component carriers of the plurality of component carriers.

8. The method of claim 1, wherein the semi-persistent resource allocation comprises resources configured for a configured grant for an uplink transmission.

9. The method of claim 1, wherein the semi-persistent resource allocation comprises resources configured for a configured grant for a downlink transmission.

10. The method of claim 1, wherein identifying the availability indicator comprises:
    determining that a retransmission is scheduled on a first component carrier of the plurality of component carriers, wherein the availability indicator is identified to indicate that the resource is available for communicating the data transmission via the first component carrier based at least in part on determining that the retransmission is scheduled on the first component carrier.

11. The method of claim 10, wherein determining that the retransmission is scheduled comprises:
    determining that the retransmission is scheduled based at least in part on at least one of a scrambling of downlink control information by a configured scheduling radio network temporary identifier, a toggling state of a new data indicator, a scheduling of a hybrid automatic repeat request process identifier, or any combination thereof.

12. The method of claim 10, wherein at least one parameter of the semi-persistent resource allocation is updated by a corresponding parameter indicated in downlink control information that schedules the retransmission.

13. The method of claim 12, wherein the at least one parameter comprises a number of resource blocks.

14. The method of claim 1, wherein identifying the availability indicator comprises:
    determining a retransmission is not scheduled for a first component carrier of the plurality of component carriers, wherein the availability indicator is identified to indicate that the resource is not available for communicating the data transmission via the first component carrier based at least in part on determining that the retransmission is not scheduled.

15. The method of claim 1, wherein each time interval comprises a subframe.

16. The method of claim 1, wherein the availability indicator indicates a respective number of time intervals within the time window for each component carrier of the plurality of component carriers.

17. The method of claim 1, further comprising:
    identifying a default availability of the resource of the semi-persistent resource allocation on each component carrier of the plurality of component carriers; and
    communicating, after the time window, a second data transmission via at least a second subset of the plurality of component carriers based at least in part on the default availability.

18. The method of claim 17, further comprising:
    receiving second control signaling indicating the default availability, wherein identifying the default availability is based at least in part on the control signaling.

19. A method for wireless communications by a network device, comprising:
    transmitting control signaling configuring a user equipment (UE) with a plurality of component carriers for communicating with the network device and a semi-persistent resource allocation of a resource;
    transmitting an availability indicator that indicates availability of the resource of the semi-persistent resource allocation on each component carrier of the plurality of component carriers, wherein the availability indicator indicates a number of time intervals within a time window for which the availability indicator is valid; and communicating a data transmission via at least a subset of the plurality of component carriers based at least in part on the availability indicator.

20. The method of claim 19, wherein the time window begins at an end of transmission of the availability indicator.

21. The method of claim 19, wherein transmitting the availability indicator comprises:
transmitting downlink control information comprising the availability indicator.

22. The method of claim 19, wherein transmitting the availability indicator comprises:
transmitting the availability indicator as a bit map that indicates the availability of the resource of the semi-persistent resource allocation on each component carrier of the plurality of component carriers.

23. The method of claim 19, wherein transmitting the availability indicator comprises:
transmitting the availability indicator that indicates the resource is unavailable for a first component carrier of the plurality of component carriers and that indicates the resource is available for a second component carrier of the plurality of component carriers.

24. The method of claim 19, wherein transmitting the availability indicator comprises:
transmitting the availability indicator via a single component carrier of the plurality of component carriers.

25. The method of claim 19, wherein transmitting the availability indicator comprises:
transmitting the availability indicator via two or more component carriers of the plurality of component carriers.

26. The method of claim 19, wherein the semi-persistent resource allocation comprises resources configured for a configured grant for an uplink transmission.

27. The method of claim 19, wherein the semi-persistent resource allocation comprises resources configured for a configured grant for a downlink transmission.

28. The method of claim 19, further comprising:
transmitting downlink control information that updates at least one parameter of the semi-persistent resource allocation.

29. The method of claim 19, further comprising:
transmitting downlink control information that schedules a retransmission of the data transmission.

30. An apparatus for wireless communications by a user equipment (UE), comprising:
a processor,
memory coupled with the processor; and
instructions stored in the memory and executable by the processor to cause the apparatus to:
receive control signaling configuring the UE with a plurality of component carriers for communicating with a network device and a semi-persistent resource allocation of a resource for each component carrier of the plurality of component carriers;
identify an availability indicator that indicates availability of the resource of the semi-persistent resource allocation on each component carrier of the plurality of component carriers, wherein the availability indicator indicates a number of time intervals within a time window for which the availability indicator is valid; and
communicate a data transmission via at least a subset of the plurality of component carriers based at least in part on the availability indicator.

31. The apparatus of claim 30, wherein the time window begins at an end of a transmission identifying the availability indicator.

32. The apparatus of claim 30, wherein the instructions to identify the availability indicator are executable by the processor to cause the apparatus to:
receive downlink control information comprising the availability indicator.

33. The apparatus of claim 30, wherein the instructions to identify the availability indicator are executable by the processor to cause the apparatus to:
receive the availability indicator as a bit map that indicates the availability of the resource of the semi-persistent resource allocation on each component carrier of the plurality of component carriers.

34. The apparatus of claim 30, wherein the instructions to identify the availability indicator are executable by the processor to cause the apparatus to:
receive the availability indicator that indicates the resource is unavailable for a first component carrier of the plurality of component carriers and that indicates the resource is available for a second component carrier of the plurality of component carriers.

35. The apparatus of claim 30, wherein the instructions to identify the availability indicator are executable by the processor to cause the apparatus to:
receive the availability indicator via a single component carrier of the plurality of component carriers.

36. The apparatus of claim 30, wherein the instructions to identify the availability indicator are executable by the processor to cause the apparatus to:
receive the availability indicator via two or more component carriers of the plurality of component carriers.

37. The apparatus of claim 30, wherein the semi-persistent resource allocation comprises resources configured for a configured grant for an uplink transmission.

38. The apparatus of claim 30, wherein the semi-persistent resource allocation comprises resources configured for a configured grant for a downlink transmission.

39. The apparatus of claim 30, wherein the instructions to identify the availability indicator are executable by the processor to cause the apparatus to:
determine that a retransmission is scheduled on a first component carrier of the plurality of component carriers, wherein the availability indicator is identified to indicate that the resource is available for communicating the data transmission via the first component carrier based at least in part on determining that the retransmission is scheduled on the first component carrier.

40. The apparatus of claim 39, wherein the instructions to determine that the retransmission is scheduled are executable by the processor to cause the apparatus to:
determine that the retransmission is scheduled based at least in part on at least one of a scrambling of downlink control information by a configured scheduling radio network temporary identifier, a toggling state of a new data indicator, a scheduling of a hybrid automatic repeat request process identifier, or any combination thereof.

41. The apparatus of claim 39, wherein at least one parameter of the semi-persistent resource allocation is updated by a corresponding parameter indicated in downlink control information that schedules the retransmission.

42. The apparatus of claim 41, wherein the at least one parameter comprises a number of resource blocks.

43. The apparatus of claim 30, wherein the instructions to identify the availability indicator are executable by the processor to cause the apparatus to:
  determine a retransmission is not scheduled for a first component carrier of the plurality of component carriers, wherein the availability indicator is identified to indicate that the resource is not available for communicating the data transmission via the first component carrier based at least in part on determining that the retransmission is not scheduled.

44. An apparatus for wireless communications by a network device, comprising:
  a processor,
  memory coupled with the processor; and
  instructions stored in the memory and executable by the processor to cause the apparatus to:
    transmit control signaling configuring a user equipment (UE) with a plurality of component carriers for communicating with the network device and a semi-persistent resource allocation of a resource;
    transmit an availability indicator that indicates availability of the resource of the semi-persistent resource allocation on each component carrier of the plurality of component carriers, wherein the availability indicator indicates a number of time intervals within a time window for which the availability indicator is valid; and
    communicate a data transmission via at least a subset of the plurality of component carriers based at least in part on the availability indicator.

45. The apparatus of claim 44, wherein the time window begins at an end of transmission of the availability indicator.

46. The apparatus of claim 44, wherein the instructions to transmit the availability indicator are executable by the processor to cause the apparatus to:
  transmit downlink control information comprising the availability indicator.

47. The apparatus of claim 44, wherein the instructions to transmit the availability indicator are executable by the processor to cause the apparatus to:
  transmit the availability indicator as a bit map that indicates the availability of the resource of the semi-persistent resource allocation on each component carrier of the plurality of component carriers.

48. The apparatus of claim 44, wherein the instructions to transmit the availability indicator are executable by the processor to cause the apparatus to:
  transmit the availability indicator that indicates the resource is unavailable for a first component carrier of the plurality of component carriers and that indicates the resource is available for a second component carrier of the plurality of component carriers.

49. The apparatus of claim 44, wherein the instructions to transmit the availability indicator are executable by the processor to cause the apparatus to:
  transmit the availability indicator via a single component carrier of the plurality of component carriers.

50. The apparatus of claim 44, wherein the instructions to transmit the availability indicator are executable by the processor to cause the apparatus to:
  transmit the availability indicator via two or more component carriers of the plurality of component carriers.

51. The apparatus of claim 44, wherein the semi-persistent resource allocation comprises resources configured for a configured grant for an uplink transmission.

52. The apparatus of claim 44, wherein the semi-persistent resource allocation comprises resources configured for a configured grant for a downlink transmission.

53. The apparatus of claim 44, wherein the instructions are further executable by the processor to cause the apparatus to:
  transmit downlink control information that updates at least one parameter of semi-persistent resource allocation.

54. The apparatus of claim 44, wherein the instructions are further executable by the processor to cause the apparatus to:
  transmit downlink control information that schedules a retransmission of the data transmission.

55. An apparatus for wireless communications by a user equipment (UE), comprising:
  means for receiving control signaling configuring the UE with a plurality of component carriers for communicating with a network device and a semi-persistent resource allocation of a resource for each component carrier of the plurality of component carriers;
  means for identifying an availability indicator that indicates availability of the resource of the semi-persistent resource allocation on each component carrier of the plurality of component carriers, wherein the availability indicator indicates a number of time intervals within a time window for which the availability indicator is valid; and
  means for communicating a data transmission via at least a subset of the plurality of component carriers based at least in part on the availability indicator.

56. An apparatus for wireless communications by a network device, comprising:
  means for transmitting control signaling configuring a user equipment (UE) with a plurality of component carriers for communicating with the network device and a semi-persistent resource allocation of a resource;
  means for transmitting an availability indicator that indicates availability of the resource of the semi-persistent resource allocation on each component carrier of the plurality of component carriers, wherein the availability indicator indicates a number of time intervals within a time window for which the availability indicator is valid; and
  means for communicating a data transmission via at least a subset of the plurality of component carriers based at least in part on the availability indicator.

57. A non-transitory computer-readable medium storing code for wireless communications by a user equipment (UE), the code comprising instructions executable by a processor to:
  receive control signaling configuring the UE with a plurality of component carriers for communicating with a network device and a semi-persistent resource allocation of a resource for each component carrier of the plurality of component carriers;
  identify an availability indicator that indicates availability of the resource of the semi-persistent resource allocation on each component carrier of the plurality of component carriers, wherein the availability indicator indicates a number of time intervals within a time window for which the availability indicator is valid; and
  communicate a data transmission via at least a subset of the plurality of component carriers based at least in part on the availability indicator.

58. A non-transitory computer-readable medium storing code for wireless communications by a network device, the code comprising instructions executable by a processor to:
- transmit control signaling configuring a user equipment (UE) with a plurality of component carriers for communicating with the network device and a semi-persistent resource allocation of a resource;
- transmit an availability indicator that indicates availability of the resource of the semi-persistent resource allocation on each component carrier of the plurality of component carriers, wherein the availability indicator indicates a number of time intervals within a time window for which the availability indicator is valid; and
- communicate a data transmission via at least a subset of the plurality of component carriers based at least in part on the availability indicator.

* * * * *